United States Patent
Sun et al.

(10) Patent No.: US 12,350,786 B2
(45) Date of Patent: Jul. 8, 2025

(54) APPARATUS FOR AUTOMATICALLY POLISHING BUTT WELD OF ULTRALONG LARGE-DIAMETER PIPELINE

(71) Applicants: China Railway No. 3 Engineering Group Co., Ltd., Taiyuan (CN); China Railway No. 3 Engineering Group Construction and Installation Engineering Co., Ltd., Taiyuan (CN)

(72) Inventors: Depeng Sun, Taiyuan (CN); Yunlong Li, Taiyuan (CN); Yufeng Wu, Taiyuan (CN); Jianlin Zhang, Taiyuan (CN); Haojun Liu, Taiyuan (CN); Jiujun Wang, Taiyuan (CN); Ning An, Taiyuan (CN); Zhiquan Hu, Taiyuan (CN); Haimeng Gao, Taiyuan (CN); Zhichun Zhang, Taiyuan (CN); Lin Li, Taiyuan (CN)

(73) Assignee: CHINA RAILWAY NO. 3 ENGINEERING GROUP CO., LTD., Taiyuan (CN)

( * ) Notice: Subject to any disclaimer, the term of this patent is extended or adjusted under 35 U.S.C. 154(b) by 0 days.

(21) Appl. No.: 18/918,209

(22) Filed: Oct. 17, 2024

(65) Prior Publication Data
US 2025/0121473 A1    Apr. 17, 2025

(30) Foreign Application Priority Data
Oct. 17, 2023   (CN) .......................... 202311337168.7

(51) Int. Cl.
*B24B 47/12*    (2006.01)
*B24B 7/16*    (2006.01)
(Continued)

(52) U.S. Cl.
CPC .............. *B24B 47/12* (2013.01); *B24B 9/007* (2013.01); *B24B 23/08* (2013.01); *B24B 41/02* (2013.01); *B24B 7/16* (2013.01)

(58) Field of Classification Search
CPC ......... B23B 5/163; B24B 23/08; B24B 9/007; B24B 5/06; B24B 5/08; B24B 5/40;
(Continued)

(56) References Cited

U.S. PATENT DOCUMENTS 1,933,677 A * 11/1933 Moore .................... B24B 15/00
                                                            451/902
2,188,720 A *  1/1940 McQuade ............... B24B 23/08
                                                            451/441
(Continued)

FOREIGN PATENT DOCUMENTS

| | | |
|---|---|---|
| CN | 116276371 A | 6/2023 |
| CN | 116372789 A | 7/2023 |

OTHER PUBLICATIONS

First Office Action issued in Chinese Application No. 202311337168.7; mailed Nov. 24, 2023, 9 pgs.
(Continued)

*Primary Examiner* — Makena S Markman
(74) *Attorney, Agent, or Firm* — HAUPTMAN HAM, LLP

(57) ABSTRACT

An apparatus for polishing a butt weld includes a machine frame; a polishing mechanism, including a rotating arm, a supporting column rotatably mounted on the rotating arm, and a polishing roll rotatably mounted on the supporting column in a circumferential direction of the polishing roll; an angle limiting assembly, movably mounted on the rotating arm, the angle limiting assembly limiting an angle at which an outer side end of the supporting column swings upward; a roll driving part, mounted on the rotating arm. The roll driving part is in transmission connection with the
(Continued)

polishing roll and drives the polishing roll to rotate on the supporting column in the circumferential direction of the polishing roll. An arm driving part is mounted on a fixed frame, the rotating arm being mounted on the arm driving part, and the arm driving part drives the rotating arm to rotate in a circumferential direction.

2 Claims, 24 Drawing Sheets

(51) Int. Cl.
*B24B 9/00* (2006.01)
*B24B 23/08* (2006.01)
*B24B 41/02* (2006.01)

(58) Field of Classification Search
CPC ..... B24B 27/0053; B24B 41/02; B24B 29/08; B24B 47/12
USPC .................................................. 451/439, 440
See application file for complete search history.

(56) References Cited

U.S. PATENT DOCUMENTS

| | | | | |
|---|---|---|---|---|
| 2,414,731 A * | 1/1947 | Forbes, Jr. | ............... | B24B 23/08 279/2.01 |
| 2,869,293 A * | 1/1959 | Howard | ................ | B24B 9/007 451/439 |
| 3,893,263 A * | 7/1975 | Jackman | ................ | B24B 23/08 451/246 |
| 4,483,106 A * | 11/1984 | Wachs | .................... | B24B 21/06 451/310 |
| 4,821,464 A * | 4/1989 | Hummel | ............. | B24B 27/0076 451/439 |
| 4,934,109 A * | 6/1990 | Allred | ..................... | B24B 9/007 451/439 |
| 6,743,079 B2 * | 6/2004 | Bown | ..................... | B24B 23/08 451/57 |
| 10,518,376 B2 * | 12/2019 | Ulliman | .................. | B24B 15/00 |
| 2018/0243832 A1 * | 8/2018 | Bruinsma | ............... | B24B 23/08 |

OTHER PUBLICATIONS

Search Report issued in Chinese Application No. 202311337168.7; dated Nov. 22, 2023, 9 pgs.
Notification to Grant issued in Chinese Application No. 202311337168.7; mailed Nov. 30, 2023, 3 pgs.

* cited by examiner

APPARATUS FOR AUTOMATICALLY POLISHING BUTT WELD OF ULTRALONG LARGE-DIAMETER PIPELINE

RELATED APPLICATIONS

The present application claims priority from Chinese Application Number 202311337168.7 filed on Oct. 17, 2023, the disclosure of which is hereby incorporated by reference herein in its entirety.

TECHNICAL FIELD

The present invention relates to the technical field of an automatic polishing device, and in particular to an apparatus for automatically polishing a butt weld of an ultralong large-diameter pipeline.

BACKGROUND

A heating pipeline is a special pipeline for conveying a heating medium. Heating pipelines are generally connected by welding.

Before the heating pipelines are welded in pairs, it is necessary to clean a groove first. An existing method is to use an angle grinder or an electric wire brush to remove oil, rust, water and other dirt within 25 mm of the groove and front and back edges until all metal luster is exposed.

However, due to the large friction force between a grinding plate or the wire brush and the surface of the pipeline in the polishing operation, a worker is very tired in the hand-held polishing process; and the pipeline has a large diameter, and the polishing efficiency using the grinding plate or the wire brush is low, thereby affecting the overall efficiency of the pipeline erecting pairs.

SUMMARY

To solve the above technical problems. The present invention provides an apparatus for automatically polishing a butt weld of an ultralong large-diameter pipeline, which can automatically polish a pipeline groove.

The technical solution of the present invention is implemented as follows:

an apparatus for automatically polishing a butt weld of an ultralong large-diameter pipeline includes:

a machine frame, including a base for being supported on the ground, a fixed frame mounted at the top of the base, and adjustable supporting feet mounted at a top end of the fixed frame and configured to be clamped on a surface of the pipeline;

a polishing mechanism, including a rotating arm, a supporting column rotatably mounted on the rotating arm and a polishing roll rotatably mounted on the supporting column in a circumferential direction of the polishing roll;

an angle limiting assembly, movably mounted on the rotating arm, the angle limiting assembly being configured to limit an angle at which an outer side end of the supporting column swings upward;

a roll driving part, mounted on the rotating arm, the roll driving part being in transmission connection with the polishing roll and configured to drive the polishing roll to rotate on the supporting column in the circumferential direction of the polishing roll; and an arm driving part, mounted on the fixed frame, the rotating arm being mounted on the arm driving part, and the arm driving part being configured to drive the rotating arm to rotate in a circumferential direction of the pipeline.

Further, the rotating arm includes an outer sleeve, an inner column body inserted from a bottom end of the outer sleeve and rotatably mounted in the outer sleeve, an inner driving cavity arranged inside the inner column body, an inner rod rotatably mounted in the inner driving cavity, an adjusting spring fixedly mounted at an inner side end of the inner rod and a pulling block fixedly mounted at an inner side end of the adjusting spring, where an outer side end of the inner rod extends to an exterior of the outer sleeve and is bent to be parallel to an axial direction of the pipeline, the length of the outer sleeve is less than the radius of an inner cavity of the pipeline, an inner wall of an outer side end of an inner cavity of the outer sleeve protrudes inward to form a limiting ring matched with the diameter of the inner rod, a clamping groove is formed in an inner wall surface of the limiting ring, and a clamping block in sliding fit with the clamping groove is fixedly arranged on a surface of the inner rod.

Further, a hemispheric sliding block is fixedly mounted on a surface of the pulling block, an inner wall of the inner driving cavity is provided with a horizontal rail and a spiral rail which are matched with the shape of the sliding block, the horizontal rail is arranged along a half circumference of the inner driving cavity, and one end of the horizontal rail is connected to a bottom end of the spiral rail.

Further, a groove is formed in an inner side end of the polishing roll, a toothed ring is fixedly mounted on an inner wall surface of an end portion of the groove, a supporting plate is fixedly mounted at an inner side end of the supporting column, a wheel carrier is fixedly mounted on an inner side surface of the supporting plate, a ratchet wheel is fixedly mounted on the wheel carrier, a first ear plate parallel to an axial direction of the inner rod is mounted on an end face of an outer side end of the inner rod, second ear plates are mounted on an outer circumferential surface of the outer side end of the inner rod, and the wheel carrier is rotatably mounted on the first ear plate.

Further, the angle limiting assembly includes a fixed rod fixedly mounted between the second ear plates, displacement springs symmetrically sleeved at two ends of the fixed rod, and a pawl rotatably mounted on the fixed rod, where the pawl is mounted between the two displacement springs.

Further, the roll driving part includes a first motor fixedly mounted on the inner rod, a first gear fixedly mounted on a power shaft of the first motor, a second gear and a first bevel gear which are rotatably mounted on the inner rod, a second bevel gear and a third bevel gear which are rotatably mounted on the inner rod, a fourth bevel gear rotatably mounted on outer side surfaces of the second ear plates with the axis of the ratchet wheel as the center of a circle, and a fifth bevel gear and a third gear which are mounted on the supporting plate, where the first gear is meshed with the second gear, the second gear and the first bevel gear, the second bevel gear and the third bevel gear, and the fifth bevel gear and the third gear are connected through synchronous shafts, the first bevel gear is meshed with the second bevel gear, the fourth bevel gear is meshed with the third bevel gear and the fifth bevel gear, and the third gear is meshed with the toothed ring.

Further, the arm driving part includes a second motor fixedly mounted on the fixed frame, a special-shaped rod fixedly mounted on a power shaft of the second motor and a sliding base slidingly sleeved on the special-shaped rod, where the special-shaped rod is arranged in the axial direction of the pipeline, a driving ring is fixedly mounted on a surface of the sliding base close to the second motor, a mounting groove is formed in an end portion of the sliding base away from the driving ring, and a bottom end of the inner column body passes through the top of the sliding base to be rotatably mounted in the mounting groove.

Further, a displacement driving part for driving the sliding base to move in an axial direction of the special-shaped rod is mounted on the fixed frame; and the displacement driving part includes a third motor fixedly mounted on the fixed frame, a lead screw fixedly mounted on a rotating shaft of the third motor and a threaded sleeve threadedly sleeved on the lead screw, where an inner side end of the lead screw and one end of the special-shaped rod away from the fixed frame are jointly connected with a fixed plate, and a top end of the threaded sleeve is connected to the driving ring.

Further, a steering driving rack and a lifting driving rack are fixedly mounted on a surface of the fixed plate close to the special-shaped rod; a steering driving gear capable of being meshed with the steering driving rack is fixedly mounted at a bottom end of the outer sleeve; a bottom end of the steering driving gear is mounted at the top of the sliding base through an unidirectional rotation assembly; a lifting driving gear capable of being meshed with the lifting driving rack is fixedly mounted at the bottom end of the inner column body, and the lifting driving gear is rotatably mounted on an inner bottom wall of the mounting groove; a lifting rail is arranged at the bottom of the lifting driving gear; and a first limiting bead in sliding fit with the limiting rail is fixedly mounted on the inner bottom wall of the mounting groove.

Further, the unidirectional rotation assembly includes unidirectional arc-shaped rails arranged at the bottom of the steering driving gear, a second limiting bead fixedly mounted at the top of the sliding base, a Tu-shaped (Chinese character "Pinyin") storage cavity formed in a surface of the second limiting bead away from one side of the sliding base, a telescopic spring mounted inside the storage cavity, a limiting plate fixedly mounted at a top end of the telescopic spring and a limiting column fixedly mounted at the top of the limiting plate, where two unidirectional arc-shaped rails are provided, and the two unidirectional arc-shaped rails are connected end to end.

The present invention has the following beneficial effects:

1. according to the present invention, a support for connecting the ground and the pipeline is provided to serve as a frame structure of the polishing apparatus, the rotating arm with the length less than the radius of the pipeline is arranged on the support, and the supporting column is rotatably mounted at the outer side end of the rotating arm, so that the supporting column can be adjusted to be parallel to the pipe groove by overturning and adjusting the angle; the polishing roll capable of performing autorotation is arranged on the supporting column in the axial direction thereof, and the angle of the supporting column is limited in combination with the angle adjusting assembly, so that the polishing roll can be kept in contact with the pipeline groove; the roll driving part drives the polishing roll to autorotate on the pipeline groove at a high speed, so that the polishing roll has a function of polishing an abutting surface of the polishing roll and the pipeline; and the arm driving part drives the polishing roll by the rotating arm to rotate in the circumferential direction of the pipeline, so that the pipeline groove can be automatically polished.

2. According to the present invention, the rotating arm including the outer sleeve, the inner column body, the inner driving cavity, the inner rod, the adjusting spring and the pulling block is used, the horizontal rail arranged on the inner driving cavity limits the height of the pulling block, and the elasticity of the adjusting spring is utilized to provide a displacement space for pushing the polishing roll toward the outer side along the pipeline groove, so that the polishing roll can drive the axis of the ratchet wheel to move above the pipeline; in combination with the gravity of the polishing roll, the polishing roll can swing to be attached to the outer wall of the pipeline; and the angle of the pawl is locked by the pawls, so that the polishing roll can polish the outer wall of the pipeline.

3. According to the present invention, the steering driving gear is mounted at the bottom end of the outer sleeve, the steering driving rack with a specified length is arranged in a toothed surface displacement area of the steering driving gear, and the steering driving rack drives the steering driving gear so as to drive the outer sleeve to rotate; the clamping groove is formed in the outer sleeve, and a clamping block is arranged on the inner rod, so that the outer sleeve can drive the inner rod to rotate synchronously by 180°, and the steering effect on the polishing roll can be achieved; and the internal swing amplitude of the supporting column is limited, thereby ensuring that the steered polishing roll can be kept parallel to the axial direction of the pipeline.

4. According to the present invention, the lifting driving gear is mounted at the bottom end of the inner column body, and the lifting driving rack is arranged in a toothed surface displacement area of the lifting driving gear, so that in the whole process of the polishing mechanism moving into the pipeline, the lifting driving gear can be driven by the lifting driving rack to rotate in a direction opposite to the rotating direction of the outer sleeve, thereby driving the inner column body to rotate; the unidirectional arc-shaped rail is arranged at the bottom of the steering driving gear, the second limiting bead with a telescopic limiting column is arranged at the top of the sliding base, and the unidirectional arc-shaped rail abuts against the limiting column to ensure that the outer sleeve only can rotate unidirectionally, so that the sliding block only can rotate unidirectionally, the sliding block below the inner rod can be extruded into the spiral rail when the inner column body drives the spiral rail to rotate; and the spiral rail is provided, and the spiral rail is used to lift the sliding block up to drive the inner rod to move upward, so that the polishing roll moves upward to abut against the inner wall of the pipeline, and the inner wall of the pipeline can be polished.

DETAILED DESCRIPTION OF THE EMBODIMENTS

Figure 1:
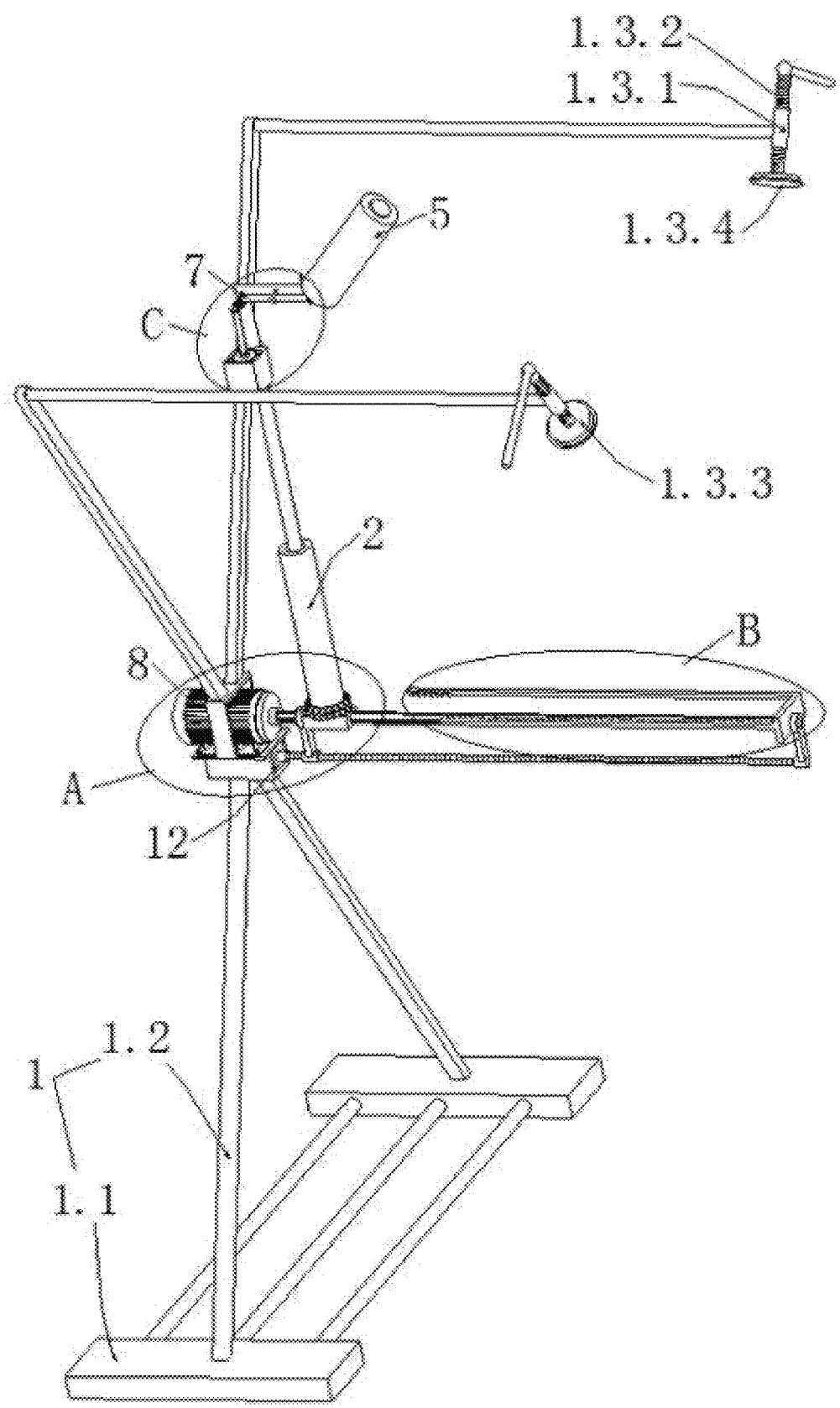
FIG. 1 is a schematic diagram of an overall structure according to the present invention.

The technical solutions in the embodiments of the present invention are described clearly and completely below. Apparently, the described embodiments are merely some embodiments of the present invention rather than all of the embodiments. All other embodiments obtained by those of ordinary skilled in the art based on the embodiments of the present invention without creative efforts shall fall within the protection scope of the present invention.

Referring to FIG. 1 to FIG. 27, the present invention provides an apparatus for automatically polishing a butt weld of an ultralong large-diameter pipeline, including a machine frame 1, a polishing mechanism 2, an angle limiting assembly 6, a roll driving part 7 and an arm driving part 8.

As shown in FIG. 1, the machine frame 1 includes a base 1.1 for being supported on the ground, a fixed frame 1.2 mounted at the top of the base 1.1, and adjustable supporting feet 1.3 mounted at a top end of the fixed frame 1.2 and configured to be clamped on a surface of the pipeline. Each of the adjustable supporting feet 1.3 includes a threaded bushing 1.3.1 fixedly mounted at an end portion of the fixed frame 1.2, an adjusting screw 1.3.2 threadedly mounted on the threaded bushing 1.3.1, a clamping plate 1.3.3 mounted at an inner side end of the adjusting screw 1.3.2 and a rubber pad 1.3.4 fixedly mounted on an inner side surface of the clamping plate 1.3.3. The adjustable feet 1.3 are symmetrically clamped on an outer circumferential surface of the pipeline, and the base 1.1 is supported on the ground, so that the position of the fixed frame 1.2 can be fixed.

The polishing mechanism 2 includes a rotating arm 3, a supporting column 4 rotatably mounted on the rotating arm 3, and a polishing roll 5 rotatably mounted on the supporting column 4 in a circumferential direction of the polishing roll. The maximum angle at which an outer side end of the supporting column 4 swings downward is that the supporting column 4 is parallel to an axial direction of the pipeline.

The angle limiting assembly 6 is movably mounted on the rotating arm 3, and the angle limiting assembly 6 is configured to limit an angle at which the outer side end of the supporting column 4 swings upward.

The roll driving part 7 is mounted on the rotating arm 3. The roll driving part 7 is in transmission connection with the polishing roll 5 and configured to drive the polishing roll 5 to rotate on the supporting column 4 in the circumferential direction of the polishing roll.

The arm driving part 8 is mounted on the fixed frame 1.2, the rotating arm 3 is mounted on the arm driving part 8, and the arm driving part 8 is configured to drive the rotating arm 3 to rotate in the circumferential direction of the pipeline, so that the polishing roll 5 can move circularly in the circumferential direction of the pipeline during autorotation, thereby completely polishing the pipeline groove and the inner and outer surfaces of the edge thereof.

Figure 7:
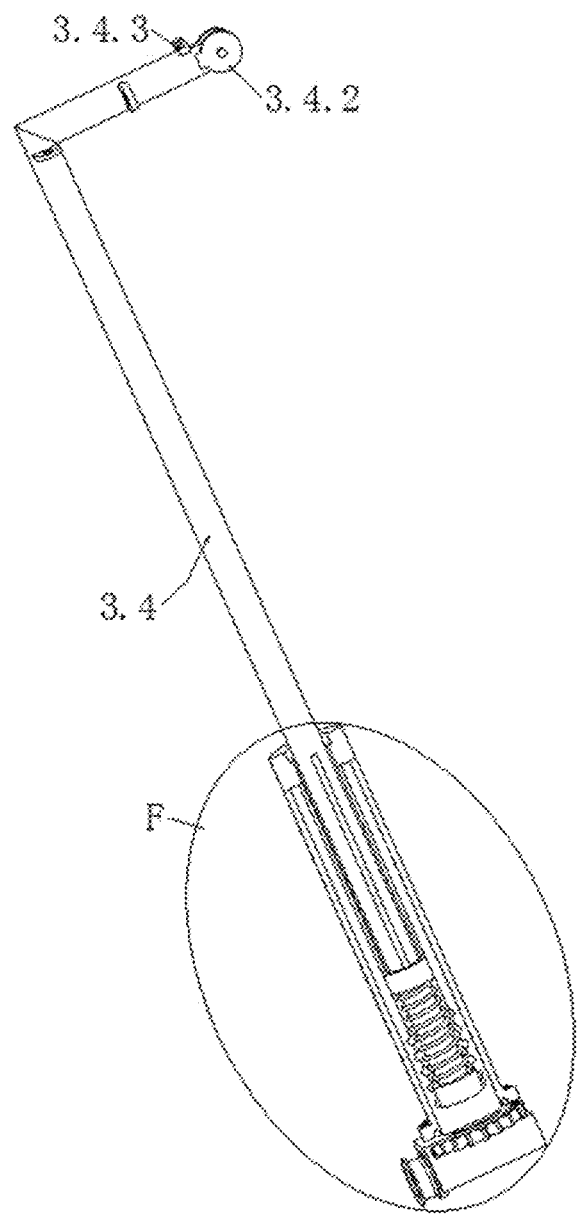
FIG. 7 is a structural schematic diagram of an inner rod according to the present invention.
Figure 8:
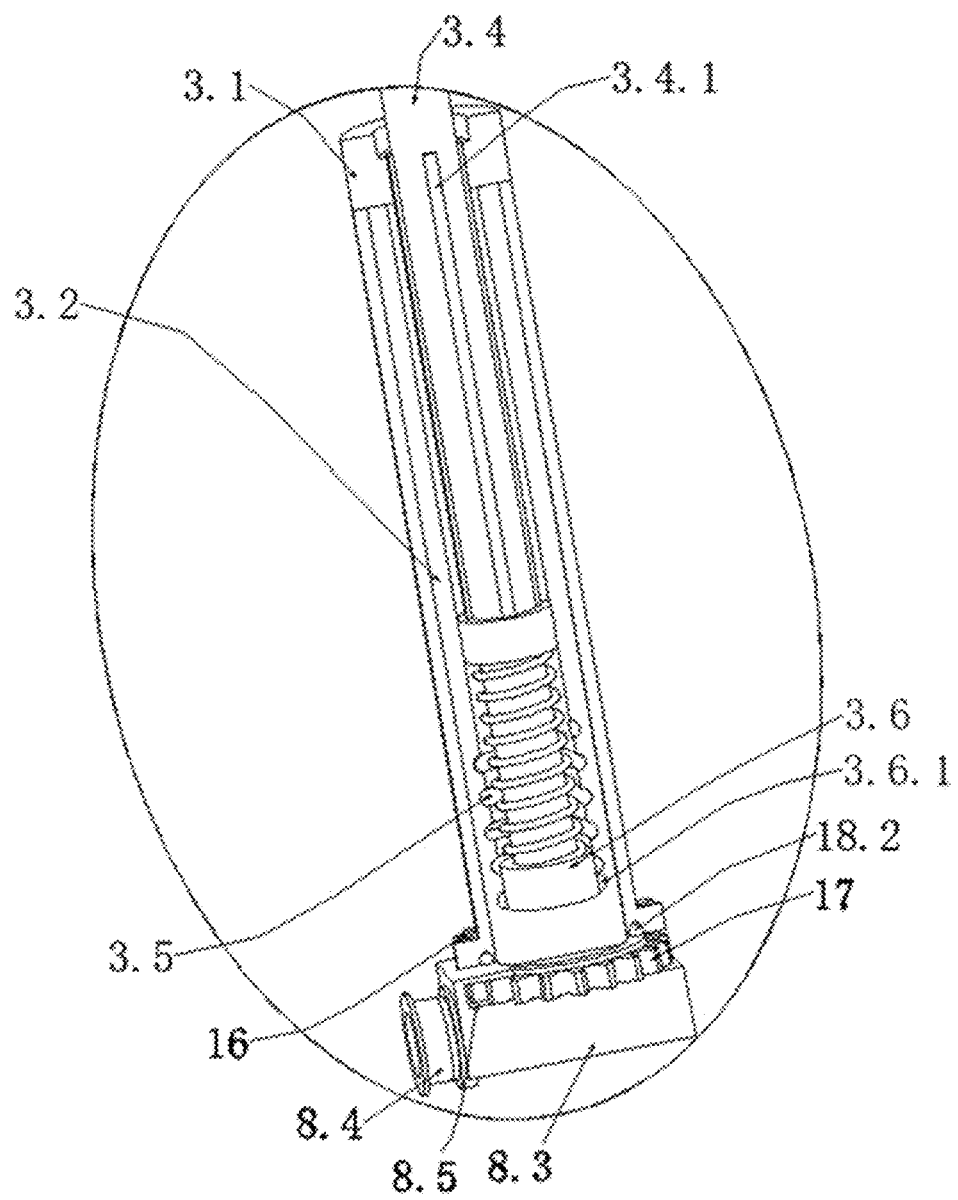
FIG. 8 is an enlarged view of a part F in FIG. 7 according to the present invention.
Figure 9:
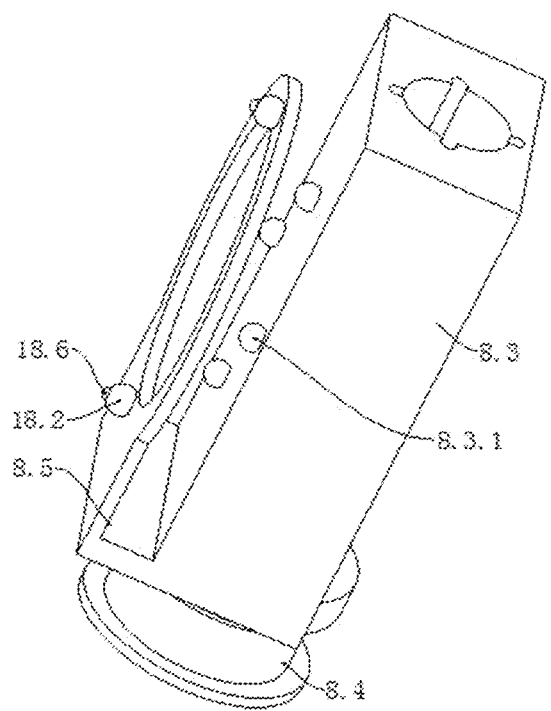
FIG. 9 is a schematic diagram of an overall structure of a sliding base according to the present invention.
Figure 10:
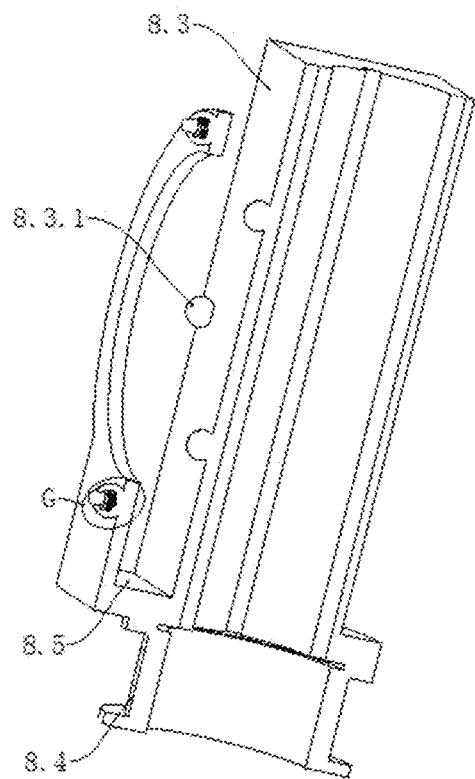
FIG. 10 is a schematic sectional view of a sliding base according to the present invention.
Figure 11:
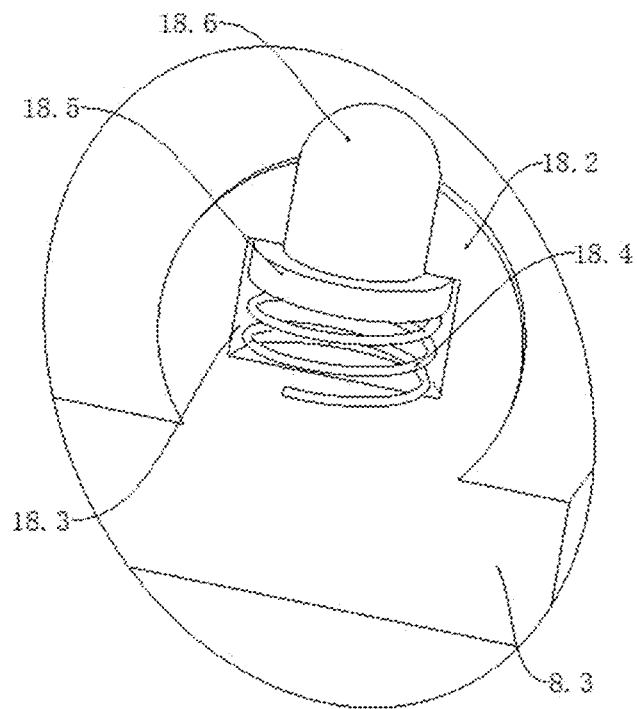
FIG. 11 is an enlarged view of a part G in FIG. 10 according to the present invention.
Figure 12:
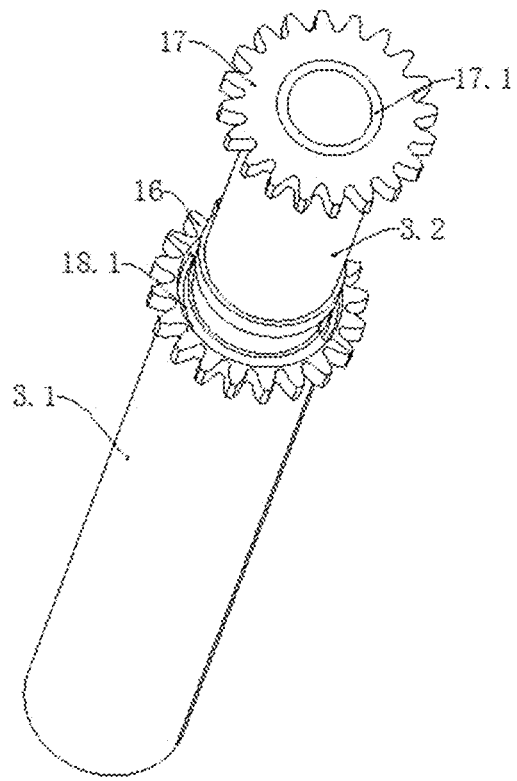
FIG. 12 is a schematic split diagram of an outer sleeve and an inner column body according to the present invention.
Figure 13:
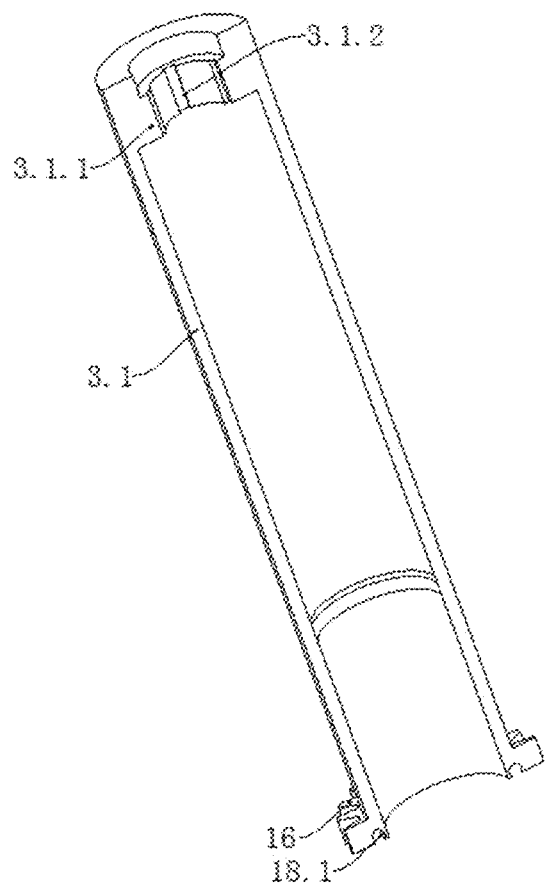
FIG. 13 is a schematic sectional view of an outer sleeve according to the present invention.
Figure 14:
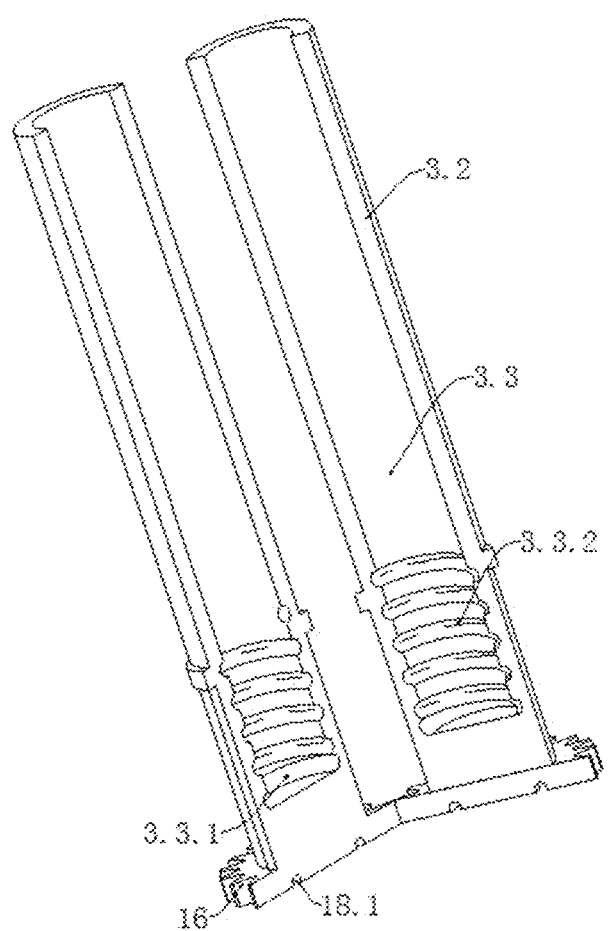
FIG. 14 is a schematic sectional view of an inner column body according to the present invention.
Figure 15:
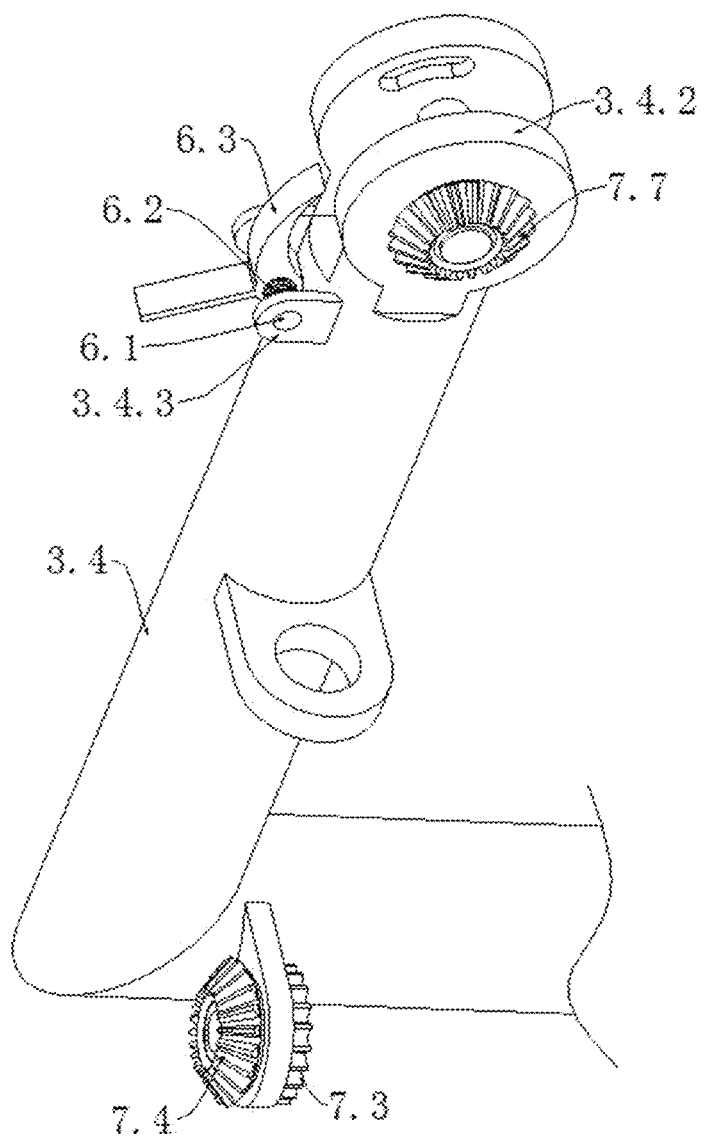
FIG. 15 is a structural schematic diagram of a second ear plate according to the present invention.
Figure 16:
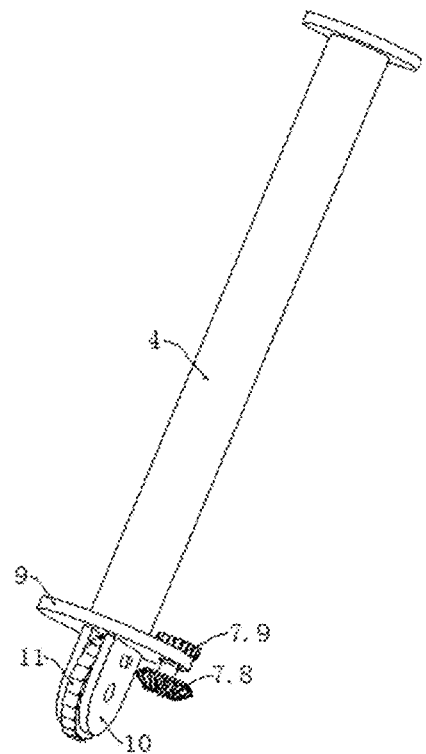
FIG. 16 is a structural schematic diagram of a supporting column according to the present invention.

As shown in FIG. 7, FIG. 8 and FIG. 14, the rotating arm 3 includes an outer sleeve 3.1, an inner column body 3.2 inserted from a bottom end of the outer sleeve 3.1 and rotatably mounted in the outer sleeve 3.1, an inner driving cavity 3.3 arranged inside the inner column body 3.2, an inner rod 3.4 rotatably mounted in the inner driving cavity 3.3, an adjusting spring 3.5 fixedly mounted at an inner side end of the inner rod 3.4, and a pulling block 3.6 fixedly mounted at an inner side end of the adjusting spring 3.5; an outer side end of the inner rod 3.4 extends to an exterior of the outer sleeve 3.1 and is bent to be parallel to the axial direction of the pipeline; and the length of the outer sleeve 3.1 is less than the radius of an inner cavity of the pipeline, so that the outer side end of the inner rod 3.4 is within the circumferential range of the inner cavity of the pipeline in an initial state. An inner wall of an outer side end of an inner cavity of the outer sleeve 3.1 protrudes inward to form a limiting ring 3.1.1 matched with the diameter of the inner rod 3.4, the outer diameter of the inner column body 32 is consistent with the inner diameter of the outer sleeve 3.1, the inner side end of the inner rod 3.4 protrudes outward to form a limiting portion, the diameter of the limiting portion is consistent with the inner diameter of the inner driving cavity 3.3, and the cooperation between the limiting ring 3.1.1 and the limiting portion can prevent the inner rod 3.4 from being separated from the outer sleeve 3.1. A clamping groove 3.1.2 is formed in an inner wall surface of the limiting ring 3.1.1, and a clamping block 3.4.1 in sliding fit with the clamping groove 3.1.2 is fixedly arranged on a surface of the inner rod 3.4. Through the cooperation between the clamping block 3.4.1 and the clamping groove 3.1.2, the outer sleeve 3.1 can drive the inner rod 3.4 to rotate synchronously, and the inner rod 3.4 can move in an axial direction thereof relative to the outer sleeve 3.1.

Figure 17:
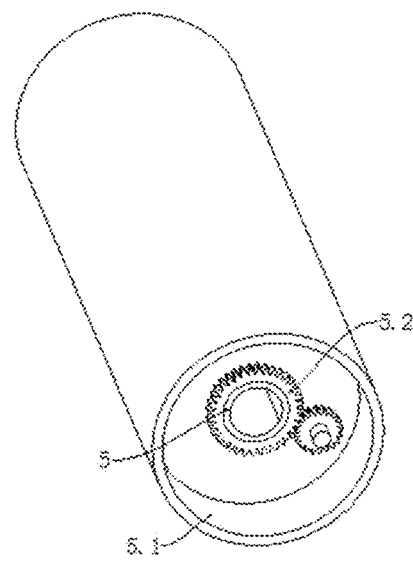
FIG. 17 is a structural schematic diagram of a polishing roll according to the present invention.
Figure 18:
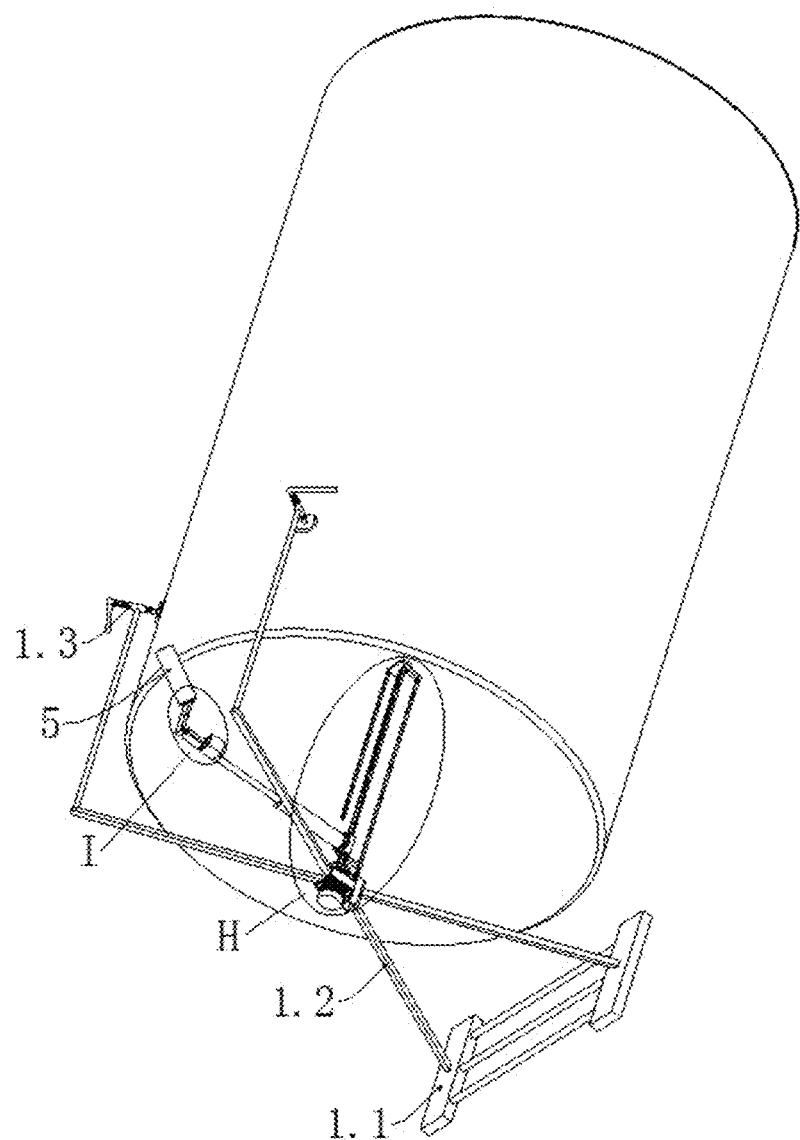
FIG. 18 is a state diagram of a polishing roll grinding a pipeline groove according to the present invention.
Figure 19:
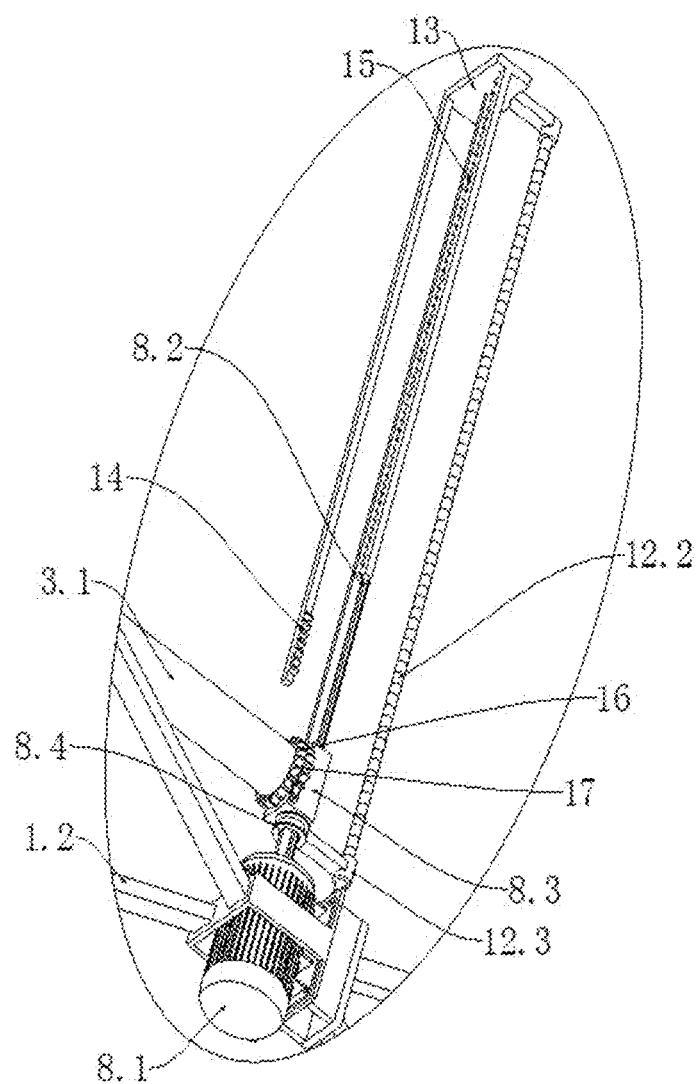
FIG. 19 is an enlarged view of a part H in FIG. 18 according to the present invention.
Figure 20:
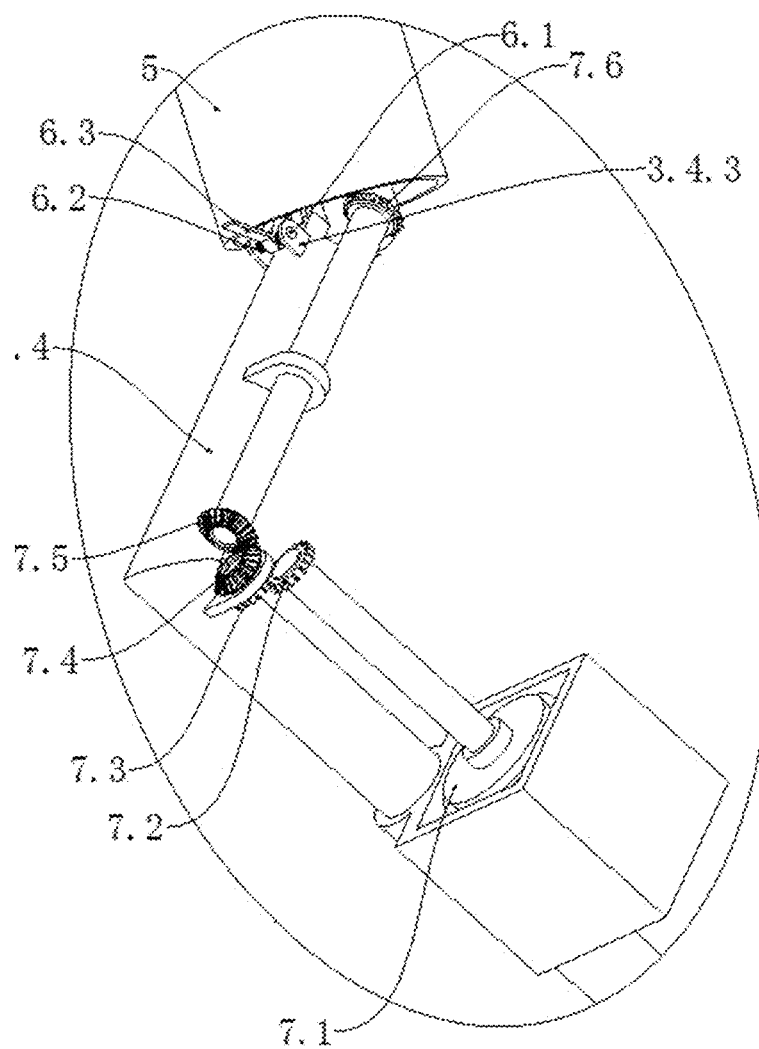
FIG. 20 is an enlarged view of a part I in FIG. 18 according to the present invention.

As shown in FIG. 14 and FIG. 17, a hemispheric sliding block 3.6.1 is fixedly mounted on a surface of the pulling block 3.6, a horizontal rail 3.3.1 and a spiral rail 3.3.2 which are matched with the shape of the sliding block 3.6.1 are arranged on an inner wall of the inner driving cavity 3.3, the horizontal rail 3.3.1 is arranged along a half circumference of the inner driving cavity 3.3, and one end of the horizontal rail 3.3.1 is connected to a bottom end of the spiral rail 3.3.2. In the initial state, the sliding block 3.6.1 is located at one end of the horizontal rail 3.3.1 not connected to the spiral rail 3.3.2, and the pulling block 3.6 is located at the bottom end of the inner driving cavity 3.3. When the inner rod 3.4 is pulled outward, the horizontal rail 3.3.1 limits the sliding block 3.6.1 to achieve the effect of preventing the pulling block 3.6 from moving outward with the adjusting spring 3.5. At this time, the adjusting spring 3.5 is stretched. Specifically, an inserting rod is fixedly arranged at the top of the pulling block 3.6, a top end of the inserting rod is inserted inside the inner rod from the bottom end of the inner rod 3.4, and the inserting rod is retractable relative to the inner rod 3.4. At this time, a strip-shaped groove parallel to the axial direction can be formed in an inner wall surface of a cavity of the inner rod 3.4, a strip-shaped block in sliding fit with the strip-shaped groove can be fixedly arranged at a top end of an outer surface of the inserting rod. Through the cooperation between the strip-shaped groove and the strip-shaped block, the telescopic movement of the inserting rod relative to the inner rod 3.4 can be implemented, and the inserting rod and the inner rod 3.4 can be kept in a relatively static state in the circumferential direction.

As shown in FIG. 6, FIG. 7, FIG. 16 and FIG. 17, a groove 5.1 is formed in an inner side end of the polishing roll 5, a toothed ring 5.2 is fixedly mounted on an inner wall surface of an end portion of the groove 5.1, the toothed ring 5.2 is driven to rotate to drive the polishing roll 5 to rotate, and the toothed ring 5.2 is mounted on a minimum circumferential surface of the groove 5.1 to reduce a toothed surface length required by the rotation of the toothed ring 5.2, so that the polishing roll 5 can rotate as fast as possible; and a supporting plate 9 is fixedly mounted at an inner side end of the supporting column 4, a wheel carrier 10 is fixedly mounted on an inner side surface of the supporting plate 9, a ratchet wheel 11 is fixedly mounted on the wheel carrier 10, a first ear plate 3.4.2 parallel to an axial direction of the inner rod 3.4 is mounted on an end face of an outer side end of the inner rod 3.4, second ear plates 3.4.3 are mounted on an outer circumferential surface of the outer side end of the inner rod 3.4, and the wheel carrier 10 is rotatably mounted on the first ear plate 3.4.2. At this time, the outer side end of the supporting column 4 swings inward and outward around the ratchet wheel 11, and the inclination angle of the polishing roll 5 can be adjusted.

To ensure that the axis of the ratchet wheel 11 can move up above the pipeline along the pipeline groove, the groove depth of the groove 5.1 should ensure that the polishing roll 5 can move along the pipeline groove until the axis of the ratchet wheel 11 reaches the length of the outer side of the pipeline.

Stop blocks are symmetrically mounted on an outer side surface of the wheel carrier 10, a limiting groove matched with the width of the stop block is formed in an inner side surface of the first ear plate 3.4.2, and the displacement of the stop blocks is limited by the limiting groove, so that the polishing roll 5 is parallel to the axial direction of the pipeline when the outer side end of the polishing roll 5 swings downward at a maximum angle.

Figure 6:
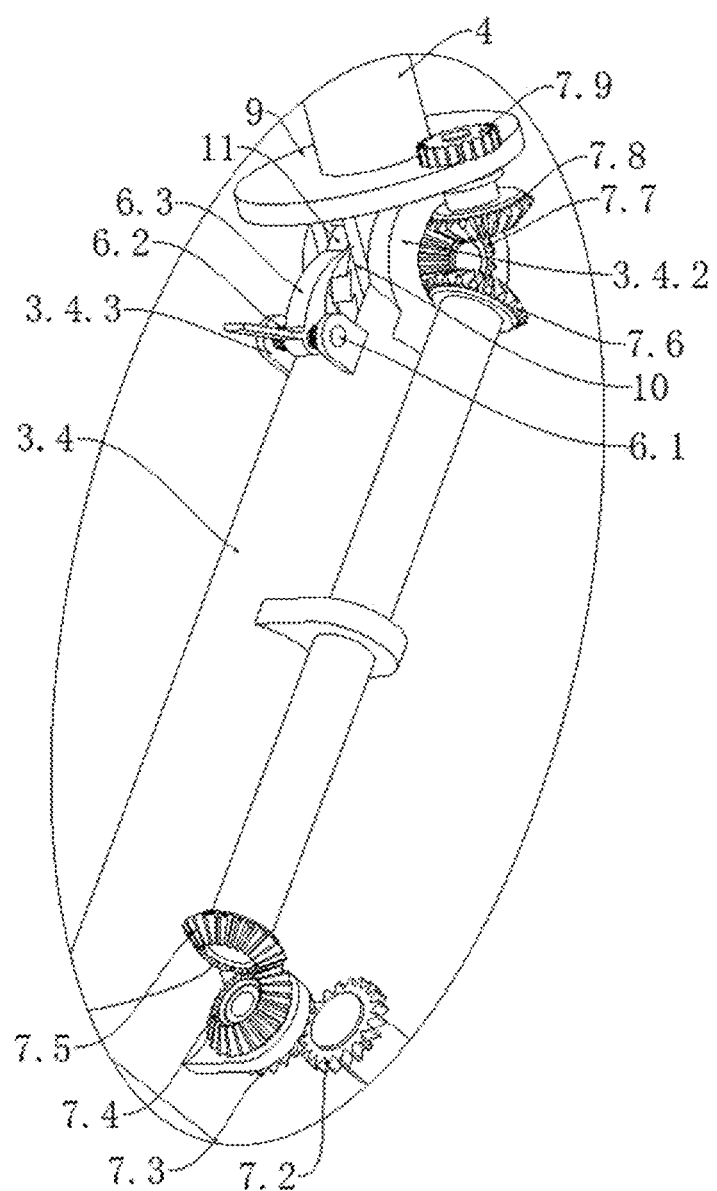
FIG. 6 is an enlarged view of a part E in FIG. 5 according to the present invention.

As shown in FIG. 6, the angle limiting assembly 6 includes a fixed rod 6.1 fixedly mounted between the second ear plates 3.4.3, displacement springs 6.2 symmetrically sleeved at two ends of the fixed rod 6.1, and a pawl 6.3 rotatably mounted on the fixed rod 6.1; and the pawl 6.3 is mounted between the two displacement springs 6.2. Specifically, the distance between the center of the fixed rod 6.1 and the center of the ratchet wheel 11 is less than the length of the pawl 6.3, and the positions of tooth tips of the ratchet wheel 6.3 correspond to the half outer circumference of the ratchet wheel 11. At this time, the pawl 6.3 has a self-locking function for the outward swing of the outer side end of the supporting column 4 under the eccentric action of the pawl, and the pawl 6.3 allows the outer side end of the supporting column 4 to swing inward freely. The elastic forces of the two displacement springs 6.2 are used to push the pawl 6.3 to be kept in the middle of the fixed rod 6.1, so that the pawl 6.3 can be kept in abutting against the toothed surface of the pawl 11. Furthermore, the two displacement springs 6.2 can be extruded to provide a leftward or rightward translation stroke for the pawl 6.3, so that the pawl 6.3 can be separated from the ratchet wheel 11.

As shown in FIG. 1, FIG. 4, FIG. 5 and FIG. 6, the roll driving part 7 includes a first motor 7.1 fixedly mounted on the inner rod 3.4, a first gear 7.2 fixedly mounted on a power shaft of the first motor 7.1, a second gear 7.3 and a first bevel gear 7.4 which are rotatably mounted on the inner rod 3.4, a second bevel gear 7.5 and a third bevel gear 7.6 which are rotatably mounted on the inner rod 3.4, a fourth bevel gear 7.7 rotatably mounted on outer side surfaces of the second ear plates 3.4.3 with the axis of the ratchet wheel 11 as the center of a circle, and a fifth bevel gear 7.8 and a third gear 7.9 which are mounted on the supporting plate 9, where the first gear 7.2 is meshed with the second gear 7.3, the second gear 7.3 and the first bevel gear 7.4, the second bevel gear 7.5 and the third bevel gear 7.6, and the fifth bevel gear 7.8 and the third gear 7.9 are connected through synchronous shafts, the first bevel gear 7.4 is meshed with the second bevel gear 7.5, the fourth bevel gear 7.7 is meshed with the third bevel gear 7.6 and the fifth bevel gear 7.8, and the third gear 7.9 is meshed with the toothed ring 5.2.

As shown in FIG. 2, FIG. 5, FIG. 8 to FIG. 10, and FIG. 19, the arm driving part 8 includes a second motor 8.1 fixedly mounted on the fixed frame 1.2, a special-shaped rod 8.2 fixedly mounted on a power shaft of the second motor 8.1 and a sliding base 8.3 slidingly sleeved on the special-shaped rod 8.2, where the special-shaped rod 8.2 is arranged in the axial direction of the pipeline, a driving ring 8.4 is fixedly mounted on a surface of the sliding base 8.3 close to the second motor 8.1, a mounting groove 8.5 is formed in an end portion of the sliding base 8.3 away from the driving ring 8.4, and a bottom end of the inner column body 3.2 passes through the top of the sliding base 8.3 to be rotatably mounted in the mounting groove 8.5. Specifically, the special-shaped rod 8.2 includes a rod body portion and a strip-shaped block fixedly arranged on a surface of the rod body portion, a through hole matched with the rod body portion is formed in the sliding base 8.3, the rod body portion penetrates through the through hole, a strip-shaped groove matched with the strip-shaped block is formed in an inner wall surface of the through hole, and the strip-shaped block is in sliding fit with the strip-shaped groove. In this way, the sliding base 8.3 can rotate with the special-shaped rod 8.2, and the sliding base 8.3 also can move on the special-shaped rod 8.2 in an axial direction.

Figure 2:
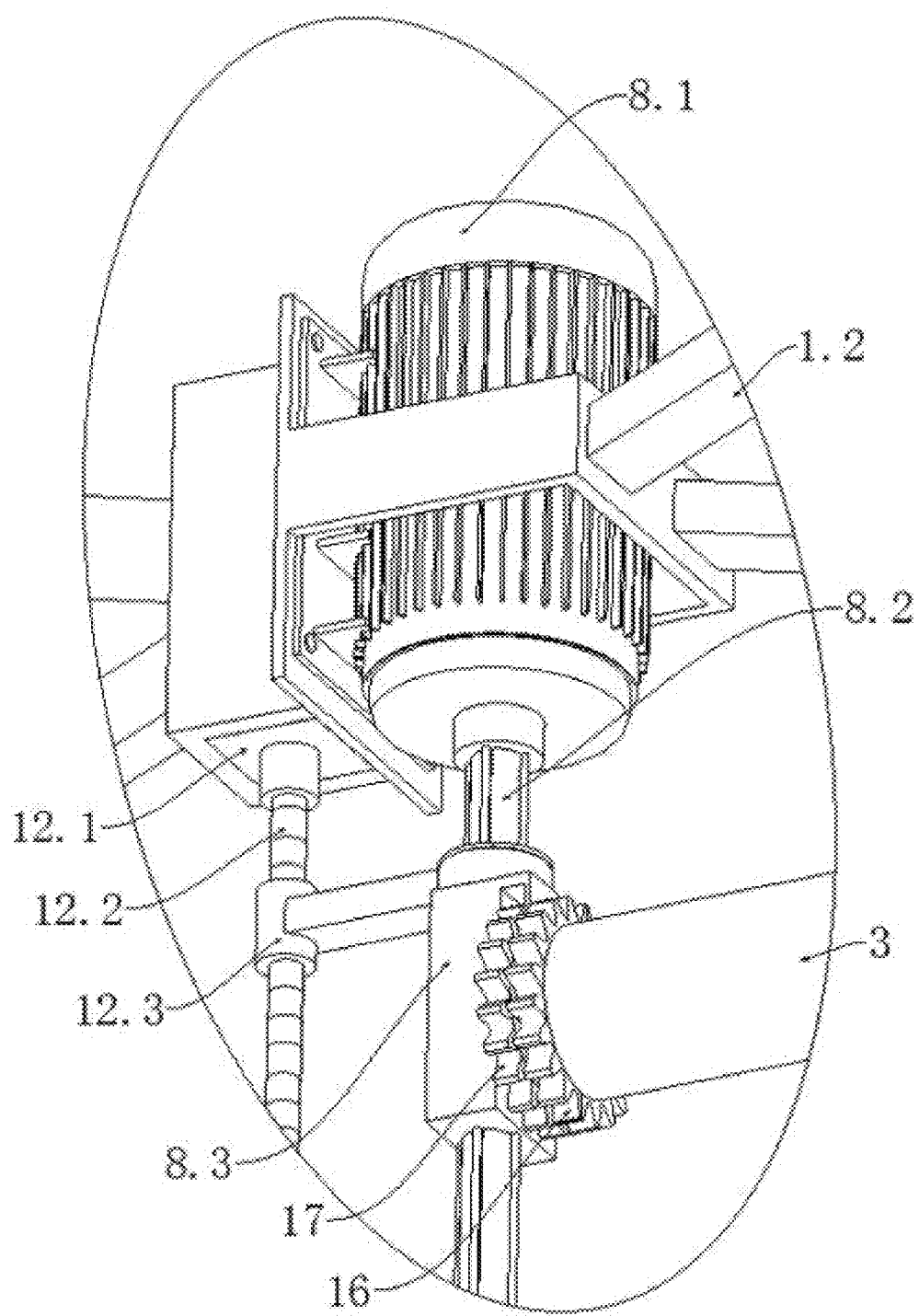
FIG. 2 is an enlarged view of a part A in FIG. 1 according to the present invention.
Figure 3:
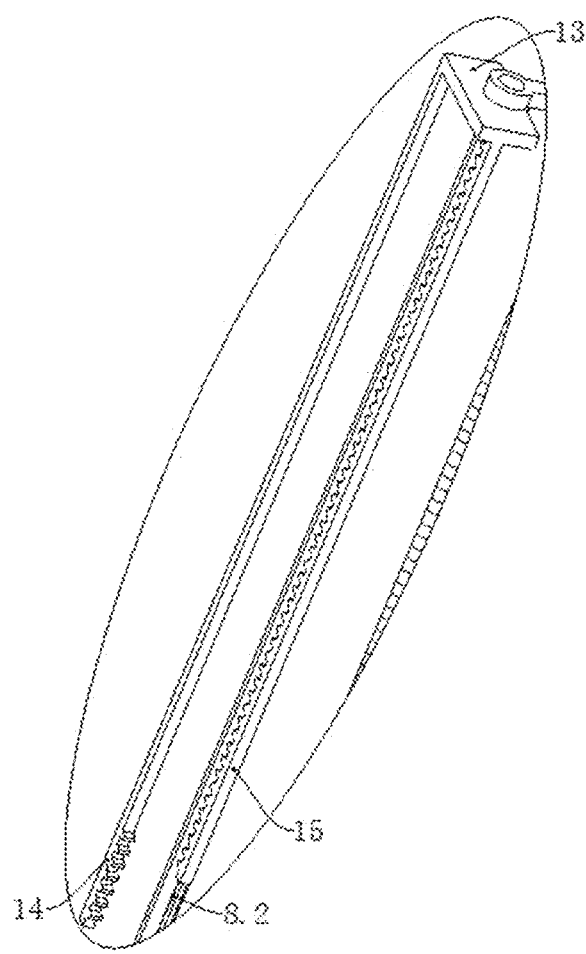
FIG. 3 is an enlarged view of a part B in FIG. 1 according to the present invention.
Figure 4:
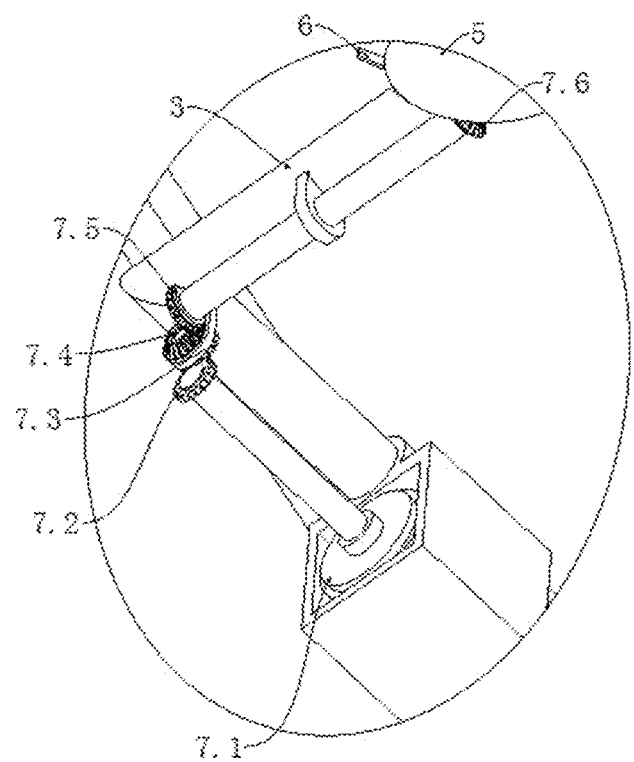
FIG. 4 is an enlarged view of a part C in FIG. 1 according to the present invention.
Figure 5:
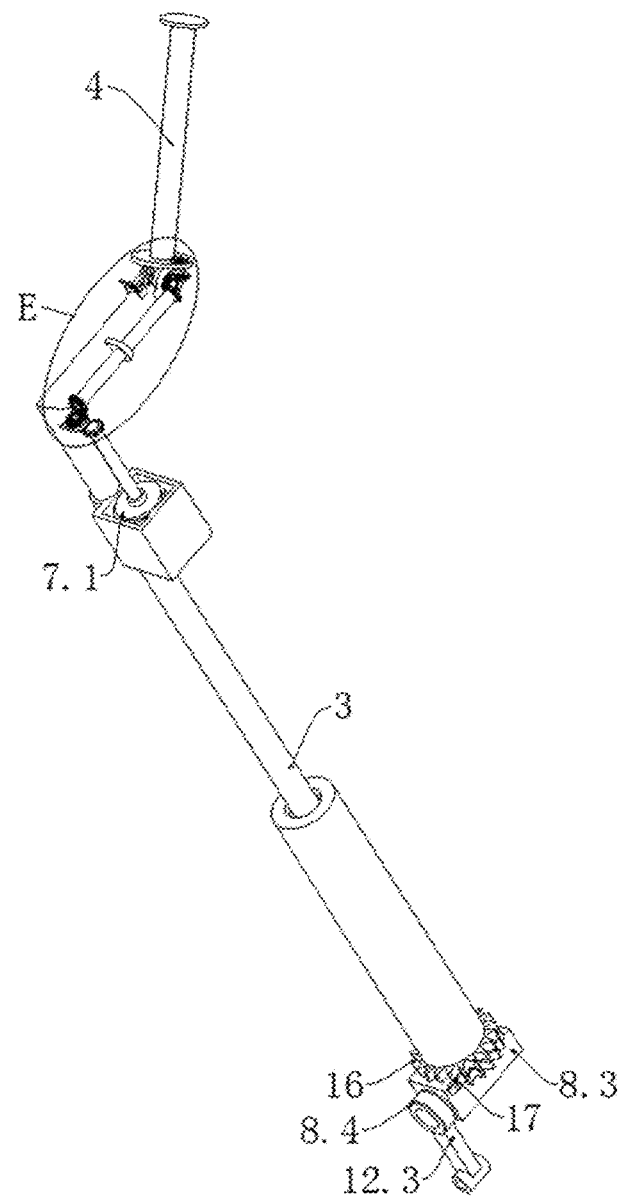
FIG. 5 is a structural schematic diagram of a polishing mechanism according to the present invention.

As shown in FIG. 1 and FIG. 2, a displacement driving part 12 for driving the sliding base 8.3 to move in an axial direction of the special-shaped rod 8.2 is mounted on the fixed frame 1.2; and the displacement driving part 12 includes a third motor 12.1 fixedly mounted on the fixed frame 1.2, a lead screw 12.2 fixedly mounted on a rotating shaft of the third motor 12.1 and a threaded sleeve 12.3 threadedly sleeved on the lead screw 12.2, where an inner side end of the lead screw 12.2 and one end of the special-shaped rod 8.2 away from the fixed frame 1.2 are jointly connected with a fixed plate 13, and a top end of the threaded sleeve 12.3 is connected to the driving ring. Specifically, a connecting plate is fixedly mounted at the top end of the threaded sleeve 12.3, and a top end of the connecting plate is rotatably connected to the driving ring 8.4. At this time, when the lead screw 12.2 rotates and drives the threaded sleeve 12.3 to move, the threaded sleeve 12.3 drives the sliding base 8.3 by a support plate to move on the special-shaped rod 8.2, so that the polishing roll 5 can be controlled to move toward or away from the pipeline by starting the third motor 12.1 to rotate forward or overturn.

As shown in FIG. 1, FIG. 3, FIG. 5, FIG. 8 to FIG. 10, and FIG. 12 to FIG. 14, a steering driving rack 14 and a lifting driving rack 15 are fixedly mounted on a surface of the fixed plate 13 close to the special-shaped rod 8.2; a steering driving gear 16 capable of being meshed with the steering driving rack 14 is fixedly mounted at a bottom end of the outer sleeve 3.1; a bottom end of the steering driving gear 16 is mounted at the top of the sliding base 8.3 through an unidirectional rotation assembly 18; a lifting driving gear 17 capable of being meshed with the lifting driving rack 15 is fixedly mounted at the bottom end of the inner column body 3.2, and the lifting driving gear 17 is rotatably mounted on an inner bottom wall of the mounting groove 8.5; the top of the lifting riving gear 17 is in contact with an inner top wall of a mounting groove 8.5; the mounting groove 8.5 abuts against the lifting driving gear 17 to prevent the displacement of the inner column body 3.2 on the sliding base 8.3; the steering driving rack 14 is positioned such that teeth thereof are positioned within the displacement range of the steering driving gear 16, and the tooth covering length of the steering driving rack 14 can drive the steering driving gear 16 to rotate in a semicircle; the lifting driving rack 15 is positioned such that teeth thereof are located with the displacement range of the lifting driving rack 15; a limiting rail 17.1 is arranged at the bottom of the lifting driving gear 17; first limiting beads 8.3.1 in sliding fit with the limiting rail 17.1 is fixedly mounted on an inner bottom wall of the mounting groove 8.5; the first limiting beads 8.3.1 are arranged on the inner bottom wall of the mounting groove 8.5 in a centrosymmetric manner; and the limiting effect of the mounting groove 8.5 on the lifting driving gear 17 can be improved by utilizing the limiting effect of the limiting rail 17.1 on the limiting column 18.6.

As shown in FIG. 8 to FIG. 14, the unidirectional rotation assembly 18 includes unidirectional arc-shaped rails 18.1 arranged at the bottom of the steering driving gear 16, a second limiting bead 18.2 fixedly mounted at the top of the sliding base 8.3, a Tu-shaped (Chinese character "Pinyin") storage cavity 18.3 formed in a surface of the second limiting bead 18.2 away from one side of the sliding base 8.3, a telescopic spring 18.4 mounted inside the storage cavity 18.3, a limiting plate 18.5 fixedly mounted at a top end of the telescopic spring 18.4 and a limiting column 18.6 fixedly mounted at the top of the limiting plate 18.5, where two unidirectional arc-shaped rails 18.1 are provided, and the two unidirectional arc-shaped rails 18.1 are connected end to end.

Each of the unidirectional arc-shaped rails 18.1 includes a big rail matched with the shape of the second limiting bead 18.2 and a small rail matched with the shape of the outer side end of the limiting column 18.6, and the big rail cooperates with the second limiting bead 18.2 to assist in limiting the relative position of the sliding base 8.3 and the outer sleeve 3.1, thereby preventing the outer sleeve 3.1 from being separated from the sliding base 8.3 during rotation.

The groove depth of the small rail is gradually increased in the circumferential directions of the unidirectional arc-shaped rails 18.1, and the limiting column 18.6 is located at one end of the small rail with a large groove depth in the initial state, thereby ensuring the limiting column 18.6 can abut against an inner wall of one end of the small rail with the large groove depth after moving every half circle to enter a new small rail, preventing the steering driving gear 16 from being driven to rotate reversely after 180° steering, preventing the sliding block 3.6.1 located at the connecting end of the horizontal rail 3.3.1 and the spiral rail 3.3.2 from being pushed by the spiral rail 3.3.2 to rotate reversely, and ensuring that during the rotation of the inner column body 3.2, the sliding block 3.6.1 can smoothly enter the spiral rail 3.3.2, the diameter of the limiting plate 18.5 is consistent with the maximum inner diameter of a storage cavity 18.3, and the diameter of the limiting column 18.6 is consistent with the minimum inner diameter of the storage cavity 18.3.

When the pipeline weld is polished, the pipeline groove, the outer wall surface at the pipeline groove and the inner wall surface at the pipeline groove are polished sequentially.

The specific operation method is as follows:

Step 1: the apparatus for automatically polishing the butt weld of the ultralong large-diameter pipeline is erected, and the specific descriptions are as follows:

a stable supporting base is arranged on the ground of a pipeline opening, thereby ensuring that the power shaft of the second motor 8.1 is centered with the pipeline after the base 1.1 is placed on the supporting base. Then the pawl 6.3 is moved toward one side so as to be separated from the ratchet wheel 11, the outer side end of the polishing roll 5 is rotated upward to be in an inclined state matched with the pipeline groove and then the pawl 6.3 is reset. Then the inclined state of the polishing roll 5 is kept and the apparatus is overally moved to the pipeline opening, so that the polishing roll 5 is tightly attached to the pipeline groove. At this time, the teeth of the steering driving rack 14 are located outside the pipeline, and the pawl 6.3 cooperates with the ratchet wheel 11 to prevent the polishing roll 5 from swinging upward, so that the polishing roll 5 is tightly attached to the pipeline groove. Then, the rubber pad 1.3.4 is attached to the outer wall of the pipeline by operating the adjustable supporting feet 1.3, so that the two adjustable supporting feet 1.3 are clamped on the outer wall of the pipeline, thereby improving the stability of the apparatus.

Step 2: the polishing operation of the pipeline groove is started. At this time, it is only necessary to directly start the first motor 7.1 and the second motor 8.1. Referring to FIG. 18 to FIG. 23, the specific descriptions are as follows:

the first motor 7.1 and the second motor 8.1, the second motor 8.1 operates to drive the special-shaped rod 8.2 to rotate through the power shaft, the special-shaped rod 8.2 drives the sliding base 8.3 to rotate, and the sliding base 8.3 drives the rotating arm 3 to do a circular motion. At this time, the rotating arm 3 drives the polishing roll 5 by the supporting column 4 to do the circulation motion when the polishing roll is tightly attached to the pipeline groove. Meanwhile, the first motor 7.1 makes the polishing roll 5 autorotate, thereby achieving the polishing effect of the polishing roll 5 on the pipeline groove.

During the operation of the first motor 7.1, the first motor 7.1 operates to drive the first gear 7.2 to rotate through the power shaft, the first gear 7.2 drives the second gear 7.3 to rotate, the second gear 7.3 drives the first bevel gear 7.4 to rotate through a rotating rod, the first bevel gear 7.4 drives the second bevel gear 7.5 to rotate, the second bevel gear 7.5 rotates the third bevel gear 7.6 to rotate through the rotating rod, the third bevel gear 7.6 drives the fourth bevel gear 7.7 to rotate, the fourth bevel gear 7.7 drives the fifth bevel gear 7.8 to rotate, the fifth bevel gear 7.8 drives the third gear 7.9 to rotate through the rotating rod, and the third gear 7.9 drives the polishing roll 5 to rotate on the supporting column 4 through the toothed ring 5.2, so that the polishing roll 5 can rapidly autorotate along the circumference of the pipeline to polish the pipeline.

Figure 21:
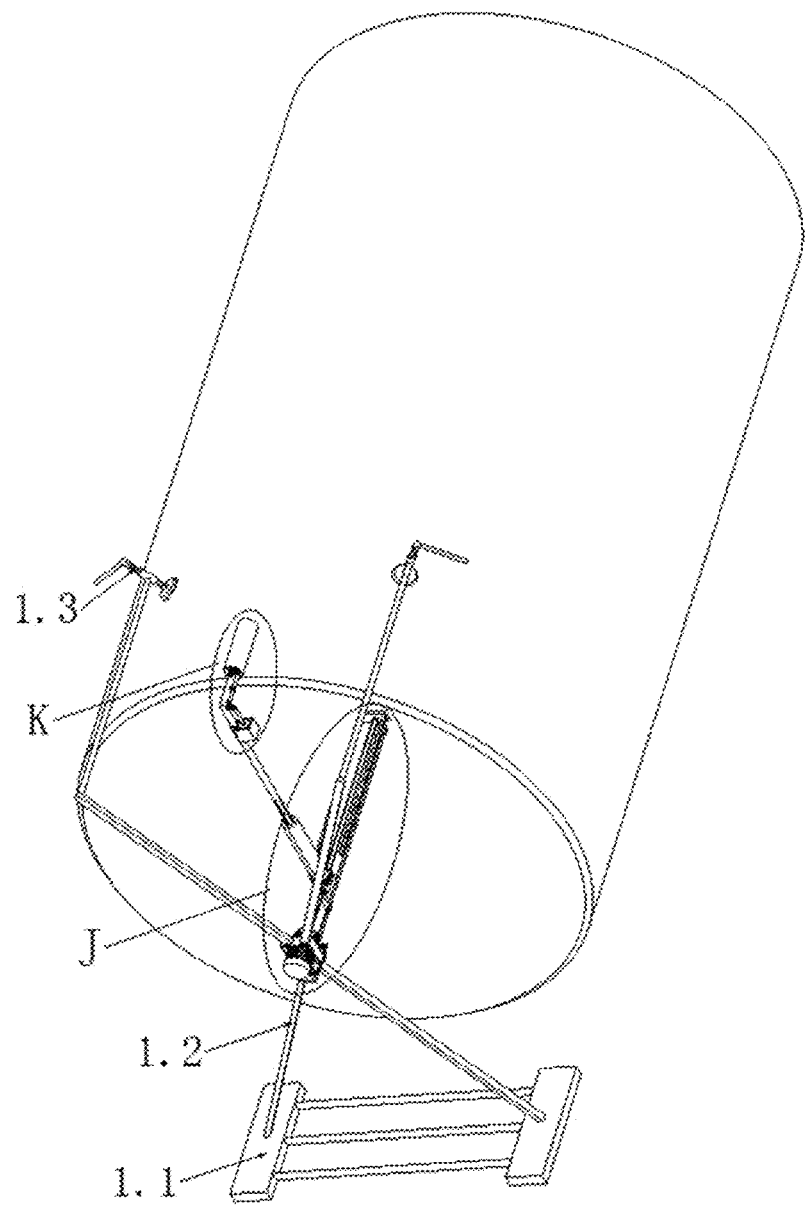
FIG. 21 is a state diagram of a polishing roll grinding an outer wall of a pipeline according to the present invention.
Figure 22:
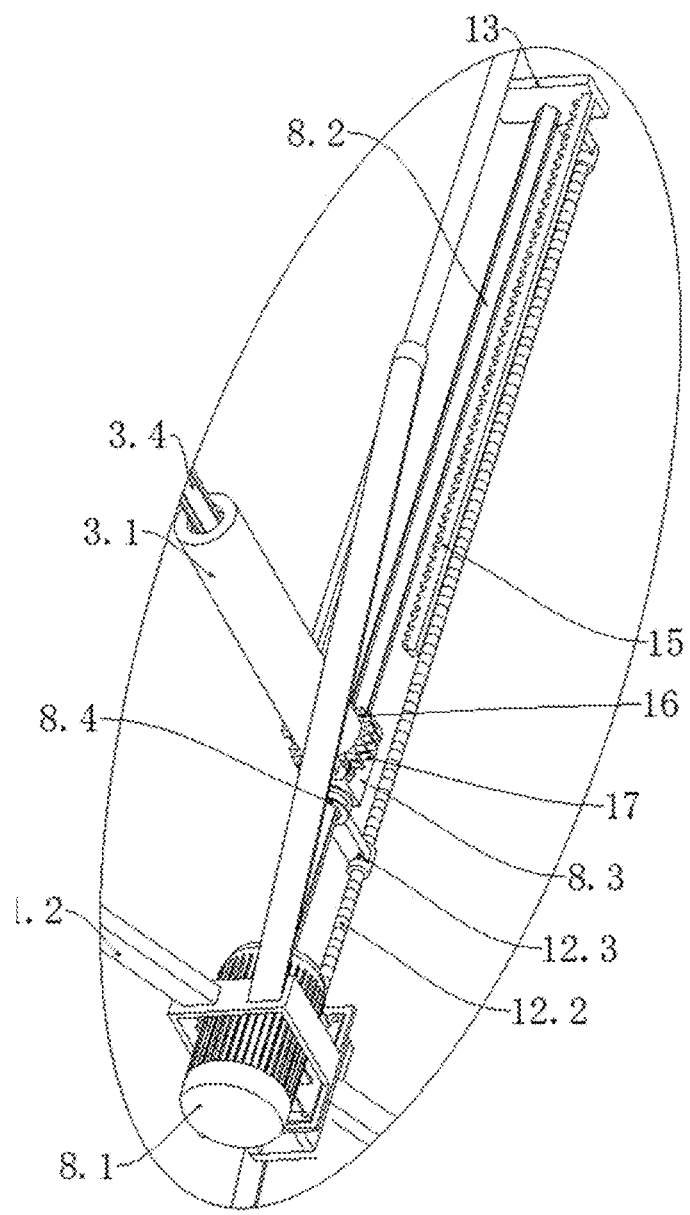
FIG. 22 is an enlarged view of a part J in FIG. 21 according to the present invention.
Figure 23:
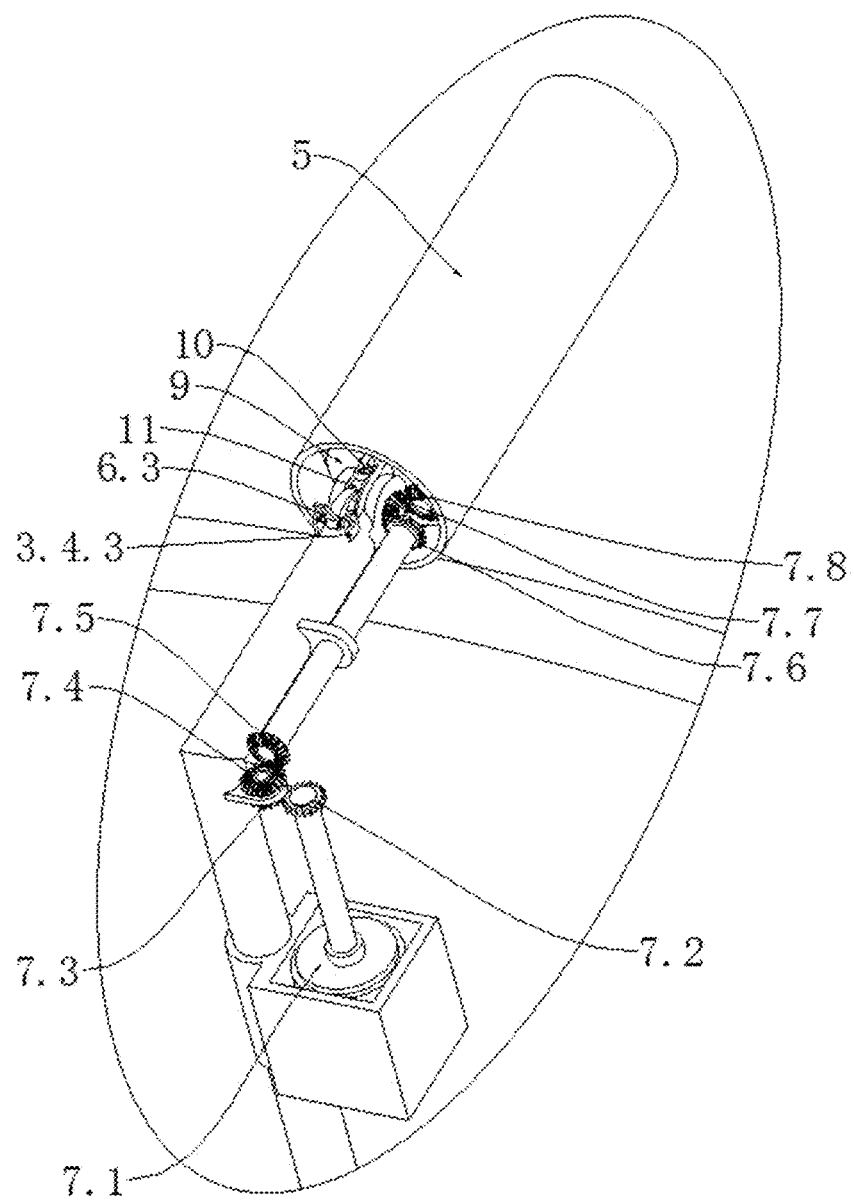
FIG. 23 is an enlarged view of a part K in FIG. 21 according to the present invention.

Step 3: the polishing operation of the outer wall surface at the pipeline groove is started. At this time, it is only necessary to directly operate the third motor 12.1. As shown in FIG. 21 to FIG. 23, the specific descriptions are as follows:

after the pipeline groove is polished, the third motor 12.1 is started to rotate forward, the third motor 12.1 drives the lead screw 12.2 to rotate through the power shaft, the lead screw 12.2 rotates to drive the threaded sleeve 12.3 to move toward one side of the pipeline, the threaded sleeve 12.3 drives the sliding base 8.3 through the driving ring 8.4 to move to the direction of the pipeline along the axial direction of the special-shaped rod 8.2, and the sliding base 8.3 drives the rotating arm 3 and the polishing mechanism 2 to move toward the direction of the pipeline overally and synchronously.

Meanwhile, the outer circumferential surface of the polishing roll 5 is kept attached to the pipeline groove, so that the polishing roll 5 is guided by the pipeline in the displacement process; and the polishing roll 5 has an upward displacement process, so that the inner rod 3.4 extends out of the inner driving cavity 3.3. When the inner rod 3.4 extends out of the inner driving cavity 3.3, the pulling block 3.6 is limited by the cooperation of the sliding block 3.6.1 and the horizontal rail 3.3.1, so that the pulling block 3.6 cannot move outward with the inner rod 3.4, and at this time, the adjusting spring 3.5 is stretched.

When the rotation center of the ratchet wheel 11 leaves the axial range of the groove and arrives at the outer wall surface of the pipeline, under the eccentric action of the polishing roll 5, the outer side end of the polishing roll 5 will swing inward until the surface of the polishing roll 5 is attached to the outer wall surface of the pipeline, and then the third motor 12.1 is suspended. At this time, the polishing roll 5 is parallel to the axial direction of the pipeline. After the polishing roll 5 swings, the pawl 6.3 locks the ratchet wheel 11 to fix the polishing roll 5 to be attached to the outer wall surface of the pipeline. Meanwhile, since the rotation center of the ratchet wheel 11 is located in the groove 5.1, the surface of the polishing roll 5 covers the position where the pipeline groove is connected to the outer wall of the pipeline, thereby achieving the all-around polishing effect on the outer wall surface at the pipeline groove.

Figure 24:
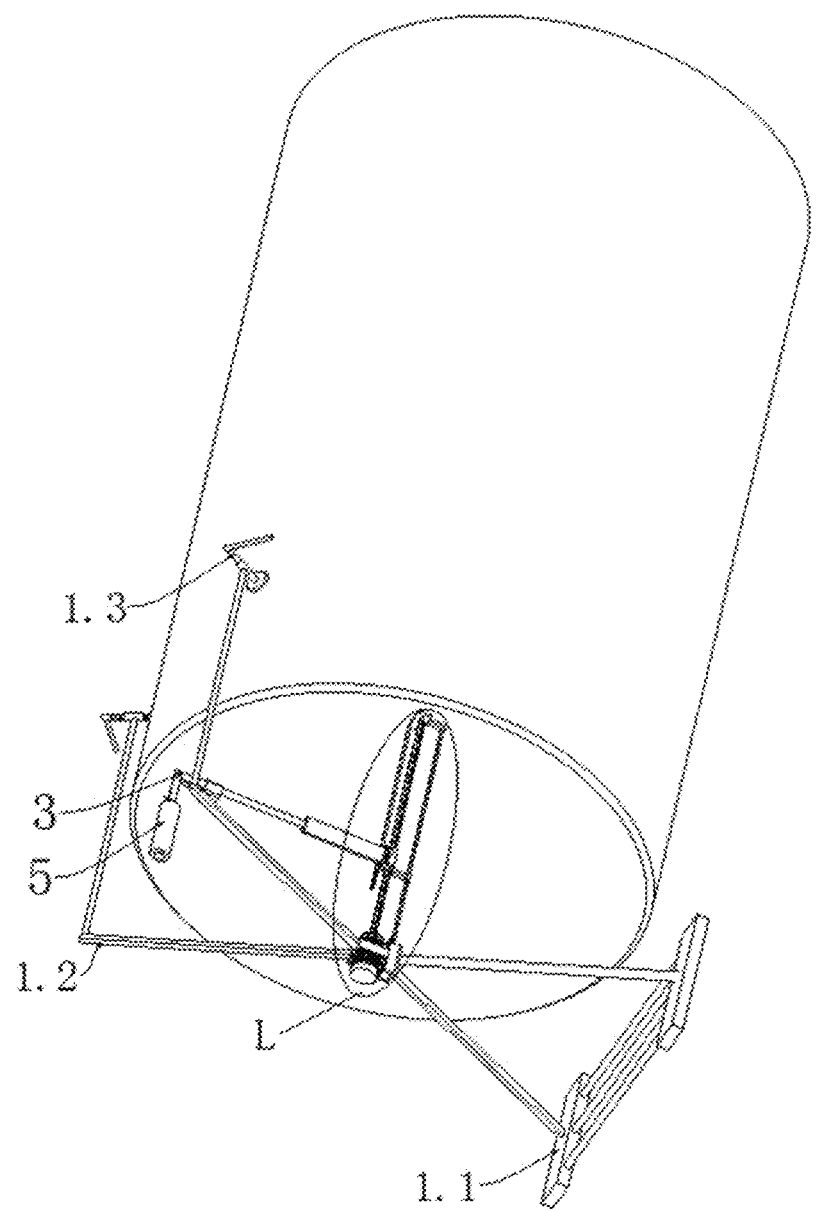
FIG. 24 is a state diagram of completing steering of a polishing roll according to the present invention.
Figure 25:
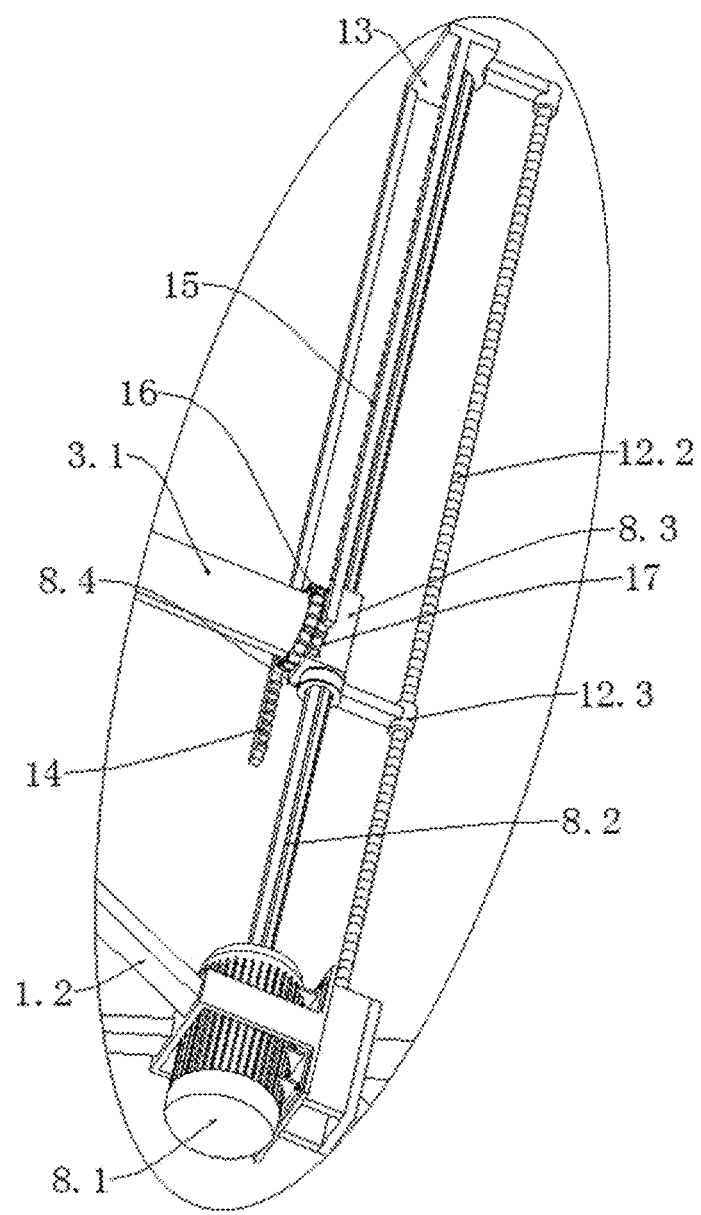
FIG. 25 is an enlarged view of a part L in FIG. 24 according to the present invention.

Step 4: when the polishing operation of the inner wall surface at the pipeline groove is started, it is only necessary to operate the third motor 12.1 again, and the specific descriptions are as follows:

as shown in FIG. 24 and FIG. 25, after the outer wall surface of the pipeline is polished, the third motor 12.1 is started again, the third motor 12.1 operates to drive the sliding base 8.3 to move toward an interior of the pipeline again, and the sliding base 8.3 drives the steering driving gear 16 and the lifting driving gear 17 to move synchronously.

When the steering driving gear 16 starts to be meshed with the steering driving rack 14, the steering driving gear 16 is driven to rotate, the steering driving gear 16 drives the outer sleeve 3.1 to rotate, the outer sleeve 3.1 drives the inner rod 3.4 to rotate through the clamping groove 3.1.2, and the inner rod 3.4 makes the supporting rod 4 do a 1800 rotation movement with the inner rod 3.4 as an axis. In this process, the polishing roll 5 is separated from the outer wall surface of the pipeline and moves in a length direction to the outer side of the pipeline.

In the above process:
1. one end of the small rail with the large groove depth in each of the unidirectional arc-shaped rails 18.1 is switched from a state of abutting against the one limiting column 18.6 to a state of abutting against another limiting column 18.6, and the steering driving gear 16 and the steering driving rack 14 are restored from a meshed state to a separated state.
2. The inner rod 3.4 drives the pulling block 3.6 to rotate synchronously through the adjusting spring 3.5, and in the rotation process, the pulling block 3.6 drives the sliding base 3.6.1 to do a 180° circular motion in the horizontal rail 3.3.1 and arrive at a position where the horizontal rail 3.3.1 is connected to the spiral rail 3.3.2, that is, enter an entrance at the bottom end of the spiral rail 3.3.2.
3. The adjusting spring 3.5 is reset, so that the inner rod 3.4 moves inside the inner driving cavity and is reset. In this process, the polishing roll 5 moves inward and to the circumferential range of the inner cavity of the pipeline, and is restored to the initial height. The polishing roll 5 is kept parallel to the axial direction of the pipeline and is locked by the limiting columns 18.6 and the unidirectional arc-shaped rails 18.1.

Figure 26:
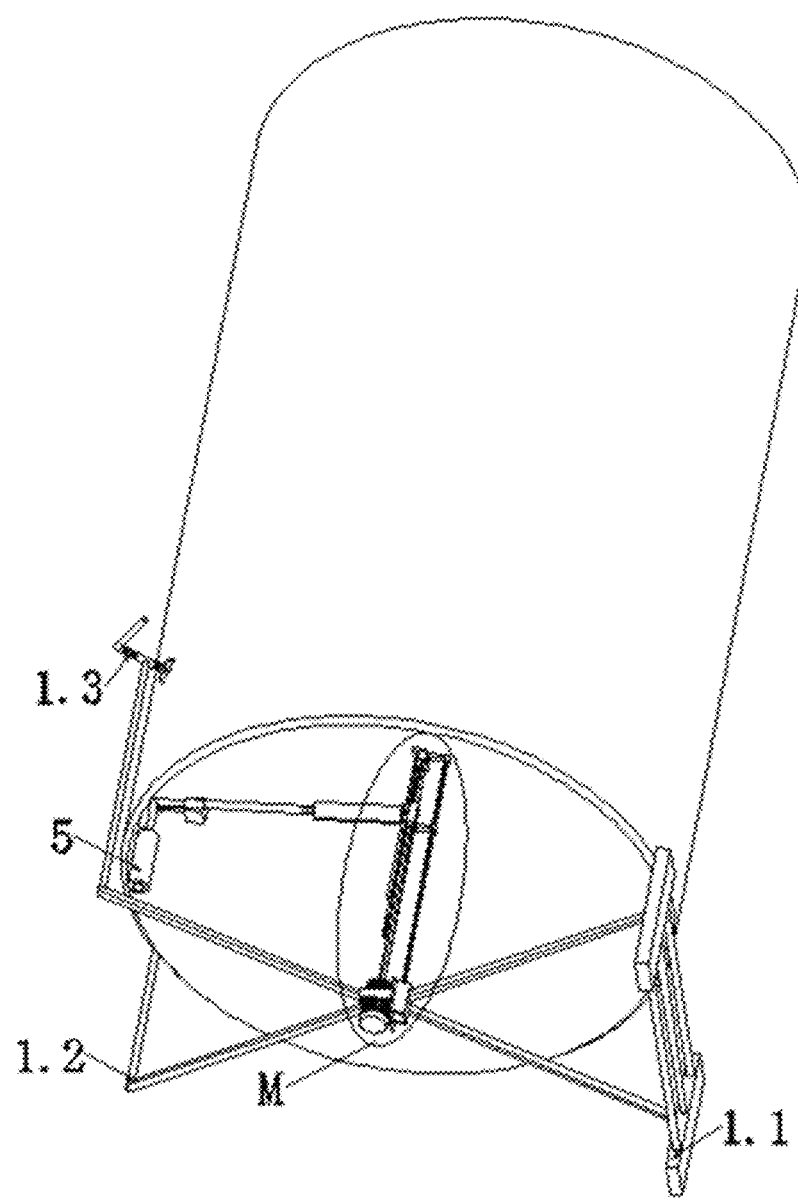
FIG. 26 is a state diagram of a polishing roll grinding an inner wall of a pipeline according to the present invention.
Figure 27:
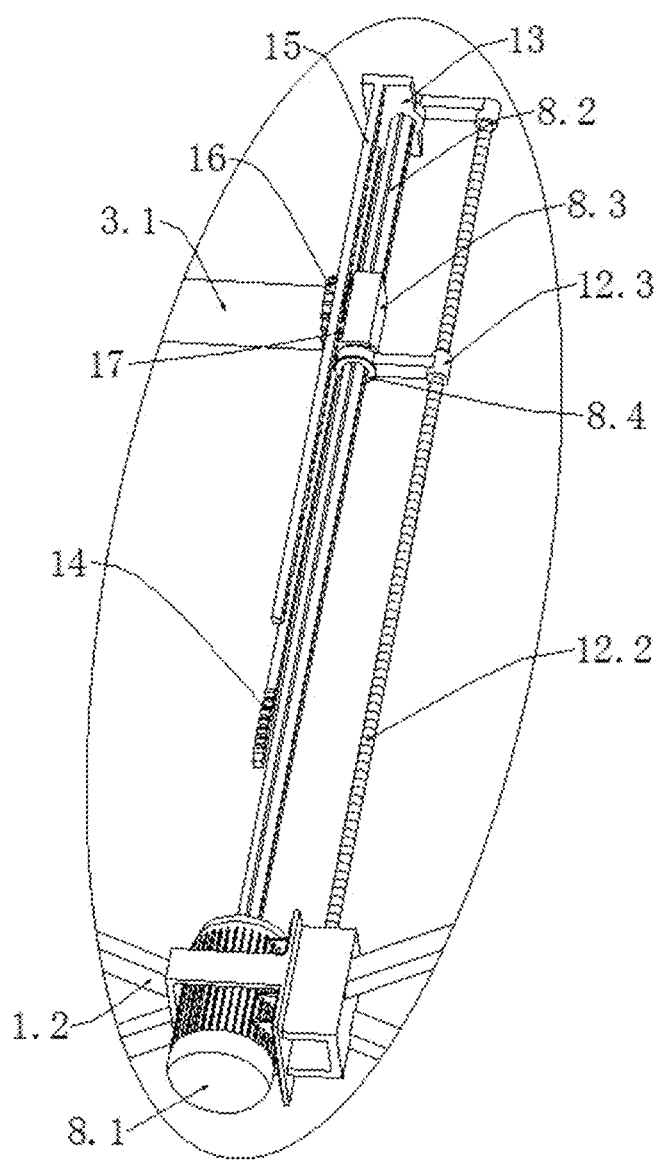
FIG. 27 is an enlarged view of a part M in FIG. 26 according to the present invention.

As shown in FIG. 26 to FIG. 27, with the continuous operation of the third motor 12.1, the sliding base 8.3 drives the rotating arm 3 and the polishing mechanism 2 to overally move inside the pipeline. After the polishing roll 5 faces one end of the pipeline and enters the pipeline and when the lifting driving gear 17 starts to be meshed with the lifting driving rack 15, the lifting driving gear 17 is driven to rotate in a direction opposite to the rotating direction of the steering driving gear 16, and the lifting driving gear 17 drives the inner column body 3.2 to rotate. At this time, the lifting driving rack 15 and the steering driving rack 14 are arranged oppositely, so that at this time, the rotating direction of the inner column body 3.2 is opposite to the rotating direction of the outer sleeve 3.1. In this process, when the inner column body 3.2 rotates, the direction of applying an action force by the spiral rail 3.3.2 to the inner rod 3.4 through the sliding block 3.6.1 and the adjusting spring 3.5 is opposite to the direction in which the groove depth of the small rail in the unidirectional arc-shaped rail 18.1 is gradually reduced. At this time, the unidirectional arc-shaped rail 18.1 have a more stable limiting effect on the outer sleeve 3.1 and the inner rod 3.4 through the limiting columns 18.6.

In the rotating process of the inner column body 3.2, the spiral rail 3.3.2 makes the pulling block 3.6 move outward in the inner driving cavity 3.3 through the sliding block 3.6.1 and pushes the inner rod 3.4 outward by extruding the adjusting spring 3.5, so that the polishing roll 5 moves outward and is in contact with the inner wall surface of the pipeline gradually. In this way, the polishing roll 5 is pushed to abut against the inner wall surface of the pipeline. Then, the omni-directional polishing process of the inner wall surface at the pipeline groove can be achieved by suspending the third motor 12.1.

In conclusion, according to the apparatus for automatically polishing the butt weld of the ultralong large-diameter pipeline provided by the present invention, the polishing roll 5 can automatically adjust the position, and can sequentially achieve the omni-directional automatic polishing objective on the pipeline groove, the outer wall surface at the pipeline groove and the inner wall surface at the pipeline groove.

The above-mentioned contents are merely preferred embodiments of the present invention, and are not used to limit the present invention, and wherever within the spirit and principle of the present invention, any modifications, equivalent replacements, improvements, and the like shall all be included within the protection scope of the present invention.

What is claimed is:

1. An apparatus for automatically polishing a butt weld of an ultralong large-diameter pipeline, comprising:
   a machine frame, comprising a base for being supported on the ground, a fixed frame mounted at the top of the base, and adjustable supporting feet mounted at a top end of the fixed frame and configured to be clamped on a surface of the pipeline;
   a polishing mechanism, comprising a rotating arm, a supporting column rotatably mounted on the rotating arm, and a polishing roll rotatably mounted on the supporting column in a circumferential direction of the polishing roll;
   an angle limiting assembly, movably mounted on the rotating arm, the angle limiting assembly being configured to limit an angle at which an outer side end of the supporting column swings upward;
   a roll driving part, mounted on the rotating arm, the roll driving part being in transmission connection with the polishing roll and configured to drive the polishing roll to rotate on the supporting column in the circumferential direction of the polishing roll; and
   an arm driving part, mounted on the fixed frame, the rotating arm being mounted on the arm driving part, and the arm driving part being configured to drive the rotating arm to rotate in a circumferential direction of the pipeline;
   wherein the rotating arm comprises an outer sleeve, an inner column body inserted from a bottom end of the outer sleeve and rotatably mounted in the outer sleeve, an inner driving cavity arranged inside the inner column body, an inner rod rotatably mounted in the inner driving cavity, an adjusting spring fixedly mounted at an inner side end of the inner rod, and a pulling block fixedly mounted at an inner side end of the adjusting spring, an outer side end of the inner rod extending to an exterior of the outer sleeve and being bent to be parallel to an axial direction of the pipeline, an inner wall of an outer side end of an inner cavity of the outer sleeve protruding inward to form a limiting ring matched with the diameter of the inner rod, a clamping groove being formed in an inner wall surface of the limiting ring, and a clamping block in sliding fit with the clamping groove being fixedly arranged on a surface of the inner rod;
   wherein a hemispheric sliding block is fixedly mounted on a surface of the pulling block, an inner wall of the inner driving cavity is provided with a horizontal rail and a spiral rail which are matched with the shape of the sliding block, the horizontal rail is arranged along a half circumference of the inner driving cavity, and one end of the horizontal rail is connected to a bottom end of the spiral rail;
   wherein a groove is formed in an inner side end of the polishing roll, a toothed ring is fixedly mounted on an inner wall surface of an end portion of the groove, a supporting plate is fixedly mounted at an inner side end of the supporting column, a wheel carrier is fixedly mounted on an inner side surface of the supporting plate, a ratchet wheel is fixedly mounted on the wheel carrier, a first ear plate parallel to an axial direction of the inner rod is mounted on an end surface of the outer side end of the inner rod, second ear plates are mounted on an outer circumferential surface of the outer side end of the inner rod, and the wheel carrier is rotatably mounted on the first ear plate;
   wherein the angle limiting assembly comprises a fixed rod fixedly mounted between the second ear plates, displacement springs symmetrically sleeved at two ends of the fixed rod, and a pawl rotatably mounted on the fixed rod, the pawl being mounted between the two displacement springs;
   wherein the roll driving part comprises a first motor fixedly mounted on the inner rod, a first gear connected to the first motor, a second gear and a first bevel gear which are rotatably mounted on the inner rod, a second bevel gear and a third bevel gear which are rotatably mounted on the inner rod, a fourth bevel gear rotatably mounted on outer side surfaces of the second ear plates with the axis of the ratchet wheel as the center of a circle, and a fifth bevel gear and a third gear which are mounted on the supporting plate, the first gear being meshed with the second gear, the second gear and the first bevel gear, the second bevel gear and the third bevel gear, and the fifth bevel gear and the third gear being connected through synchronous shafts, the first bevel gear being meshed with the second bevel gear, the fourth bevel gear being meshed with the third bevel gear and the fifth bevel gear, and the third gear being meshed with the toothed ring;
   wherein the arm driving part comprises a second motor fixedly mounted on the fixed frame, a rod connected the second motor, and a sliding base slidingly sleeved on the rod, the rod being arranged in the axial direction of the pipeline, a driving ring being fixedly mounted on a surface of the sliding base close to the second motor, a mounting groove being formed in an end portion of the sliding base away from the driving ring, and a bottom end of the inner column body passing through the top of the sliding base to be rotatably mounted in the mounting groove;
   wherein a displacement driving part for driving the sliding base to move in an axial direction of the rod is mounted on the fixed frame; and the displacement driving part comprises a third motor fixedly mounted on the fixed frame, a lead screw fixedly mounted on a rotating shaft of the third motor, and a threaded sleeve threadedly sleeved on the lead screw, an inner side end of the lead screw and one end of the rod away from the fixed frame being jointly connected with a fixed plate, and a top end of the threaded sleeve being connected to the driving ring;
   wherein a steering driving rack and a lifting driving rack are fixedly mounted on a surface of the fixed plate close to the rod; a steering driving gear capable of being meshed with the steering driving rack is fixedly mounted at a bottom end of the outer sleeve; a bottom end of the steering driving gear is mounted at the top of the sliding base through an unidirectional rotation assembly; a lifting driving gear capable of being meshed with the lifting driving rack is fixedly mounted at the bottom end of the inner column body, and the lifting driving gear is rotatably mounted on an inner bottom wall of the mounting groove; a lifting rail is arranged at the bottom of the lifting driving gear; and a first limiting bead in sliding fit with the limiting rail is fixedly mounted on the inner bottom wall of the mounting groove.

2. The apparatus for automatically polishing a butt weld of an ultralong large-diameter pipeline according to claim 1, wherein the unidirectional rotation assembly comprises unidirectional arc-shaped rails arranged at the bottom of the steering driving gear, a second limiting bead fixedly mounted at the top of the sliding base, a storage cavity formed in a surface of the second limiting bead away from one side of the sliding base, a telescopic spring mounted inside the storage cavity, a limiting plate fixedly mounted at a top end of the telescopic spring, and a limiting column fixedly mounted at the top of the limiting plate, the two unidirectional arc-shaped rails being connected end to end.

* * * * *